(12) United States Patent
Kitahara

(10) Patent No.: US 7,062,907 B2
(45) Date of Patent: Jun. 20, 2006

(54) REGENERATION CONTROL SYSTEM

(75) Inventor: Yasuhisa Kitahara, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/892,198

(22) Filed: Jul. 16, 2004

(65) Prior Publication Data
US 2005/0022505 A1    Feb. 3, 2005

(30) Foreign Application Priority Data
Jul. 30, 2003    (JP)    ............... 2003-282722

(51) Int. Cl.
*F01N 3/00*    (2006.01)
(52) U.S. Cl. .................. 60/295; 60/274; 60/285; 60/286; 60/297; 60/311
(58) Field of Classification Search .................. 60/274, 60/285, 286, 295, 297, 301, 311; 123/299, 123/300
See application file for complete search history.

(56) References Cited

U.S. PATENT DOCUMENTS 5,974,791 A * 11/1999 Hirota et al. .................. 60/276
6,622,480 B1 * 9/2003 Tashiro et al. .................. 60/295
6,666,020 B1 * 12/2003 Tonetti et al. .................. 60/286
6,772,585 B1 * 8/2004 Iihoshi et al. .................. 60/277
6,796,118 B1 * 9/2004 Kitahara .................. 60/285

FOREIGN PATENT DOCUMENTS

JP    2000-179326 A    6/2000

* cited by examiner

*Primary Examiner*—Thomas Denion
*Assistant Examiner*—Diem Tran
(74) *Attorney, Agent, or Firm*—Shinjyu Global IP Counselors

(57) ABSTRACT

The regeneration control system is provided that conducts a regeneration processing for oxidizing particulate matter collected in the diesel particulate filter (DPF) whereby the regeneration processing can be performed efficiently while avoiding the melting of the diesel particulate filter. The regeneration control system is provided for an exhaust filter wherein at least one parameter selected from among the target filter temperature, target exhaust air-fuel ratio, and target regeneration control time in the DPF regeneration is varied in accordance with the amount of particulate matter when the exhaust air-fuel ratio and exhaust temperature are controlled to perform the DPF regeneration by staged retarded combustion, which is composed of preliminary combustion that is performed at least once in the vicinity of the top dead center, and main combustion that causes the generation of main torque and is initiated after the preliminary combustion has been completed.

25 Claims, 19 Drawing Sheets

REGENERATION CONTROL SYSTEM

BACKGROUND OF THE INVENTION

1. Field of the Invention

The present invention generally relates to a regeneration control system for an exhaust filter. More specifically, the present invention relates to a regeneration control system for oxidizing exhaust particulate matter collected by an exhaust filter.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). Some prior exhaust systems for diesel engines often include a diesel particulate filter (DPF) and a NOx trapping catalytic converter that are disposed in an exhaust passage. The diesel particulate filter (DPF) traps particulate matters (PM) in the exhaust gas, while the NOx trapping catalytic converter traps NOx in the exhaust gas when an air-fuel ratio in the exhaust gas is in a lean range and purifies the trapped NOx when the air-fuel ratio is in a rich range. The particulate matters deposited in the diesel particulate filter (DPF) and the NOx deposited in the NOx trapping catalytic converter are respectively purified at a predetermined period of time.

The diesel particulate filter (DPF) is provided in the exhaust system for collecting particulate matter. The diesel particulate filter (DPF) is regenerated by combusting the particulates collected by the diesel particulate filter (DPF) at regular intervals through exhaust temperature manipulation or the like. One example of an internal combustion engine having a NOx trapping catalytic converter provided in the exhaust system for cleaning NOx discharged from the engine is disclosed in Japanese Laid-Open Patent Publication No. 2000-179326.

In view of the above, it will be apparent to those skilled in the art from this disclosure that there exists a need for an improved regeneration control system. This invention addresses this need in the art as well as other needs, which will become apparent to those skilled in the art from this disclosure.

SUMMARY OF THE INVENTION

It has been discovered that when the DPF regeneration control is performed in conditions (high temperature, lean air/fuel ratio) in which the particulates can be easily combusted, there is a possibility that the diesel particulate filter (DPF) will melt due to the rapid combustion of the particulates.

Another drawback is that regeneration of the diesel particulate filter (DPF) cannot be efficiently regenerated when the exhaust temperature is kept low and the exhaust air/fuel ratio is given a richer setting to prevent the particulates from combusting rapidly.

The present invention was contrived in view of the above-described drawbacks, and an object thereof is to provide a regeneration control system for an exhaust filter that is capable of efficient DPF regeneration while preventing the diesel particulate filter (DPF) from melting due to rapid particulate combustion.

In accordance with one aspect of the present invention, a regeneration control system is provided for an engine that basically comprises an exhaust particulate collecting section, a regeneration control section and a control unit. The exhaust particulate collecting section is configured to collect particulate matter from exhaust gas from the engine. The regeneration control section is configured to conduct regeneration control for at least oxidizing the particulate matter collected by the exhaust particulate collecting section. The control unit is configured to adjust during the regeneration control at least one of a target filter temperature, a target exhaust air-fuel ratio, and a target regeneration control time in the regeneration control for oxidizing the particulate matter collected by the exhaust particulate collecting section in accordance with a decrease in the particulate matter collected by the exhaust particulate collecting section associated with the regeneration control.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
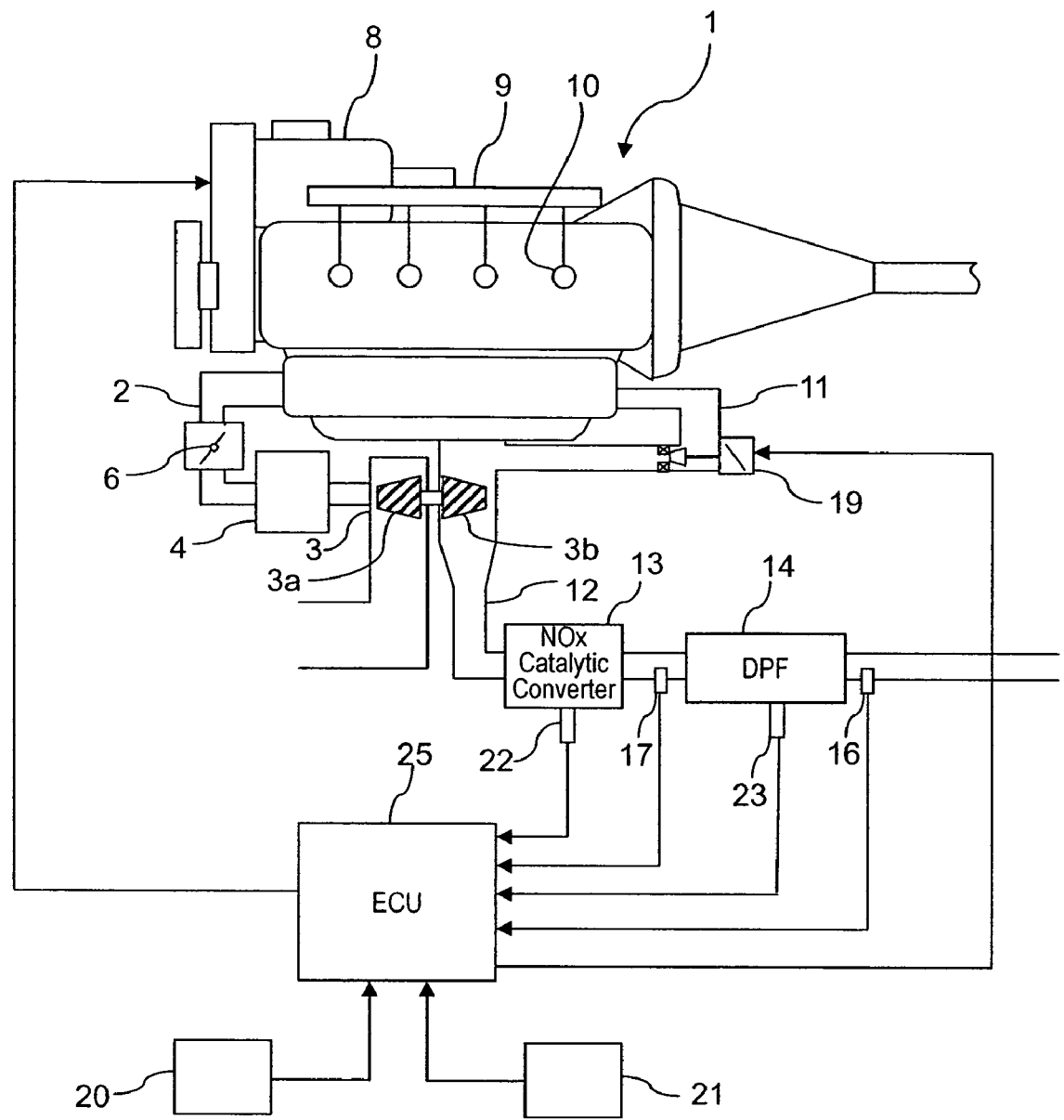
FIG. 1 is a diagrammatic view of an regeneration control system or system for an internal combustion engine, e.g., a diesel engine, in accordance with one embodiment of the present invention.

Referring initially to FIG. 1, a regeneration control system is illustrated for an internal combustion engine such as a supercharged diesel engine 1 in accordance with one embodiment of the present invention. The regeneration control system in accordance with the present invention can be applied to internal combustion engines used in automobiles and the like.

As shown in to FIG. 1, the engine 1 includes an air intake passage 2 having a turbocharger (supercharger) 3 with a compressor 3a disposed upstream in the air intake passage 2 of the air intake system. The compressor 3a serves to pressurize the intake air. The compressor 3a is rotated by a turbine 3b that is driven by exhaust gas flowing through an exhaust system of the engine 1. The air intake passage 2 of the air intake system also an intercooler 4 for cooling the intake air after supercharging the intake air by the compressor 3a of the turbocharger (supercharger) 3. An air intake throttle 6 is disposed in the air intake passage 2 of the air intake system to regulate the flow of intake air to the combustion chambers of each cylinder of the engine 1.

The engine 1 further includes a common rail fuel injection device or system including a pressure fuel injection pump 8, a common rail 9 and a plurality of fuel injection valves 10, so that the fuel placed is under high pressure by the fuel injection pump 8, fed to the common rail 9, and directly injected from the fuel injection valves 10 into the combustion chambers of each cylinder of the engine 1. In other words, the pressure fuel injection pump 8 pumps fuel to the common rail 9, where the pressurized fuel accumulates, and high-pressure fuel is injected directly into the combustion chambers of each cylinder when the fuel injection valves 10 are opened. Thus, the fuel injection pump 8, the common rail 9, and the fuel injection valves 10 constitute a common rail fuel injection device or system.

A fuel-air mixture generated by intake air that flows into the combustion chambers and high-pressure fuel that is injected into the combustion chambers is combusted by compression ignition, and the exhaust gas is exhausted to the exhaust system. The exhaust system includes an exhaust gas recirculation (EGR) passage 11 that branches from a main exhaust passage 12 from a position between the engine 1 and the turbine 3b.

Thus, a portion of the exhaust gas is evacuated from the exhaust passage 12 and returned to the air intake passage 2 of the air intake system by way of the exhaust gas recirculation (EGR) passage 11. The EGR passage 11 connects to the air intake passage 2 downstream of the intake air throttle valve 6. The remainder of the exhaust gas rotatably drives the turbine 3b of the turbocharger 3, while the compressor 3a turbocharges the intake air. Preferably, the compressor 3a is provided on the same axle as the turbine 3b. More preferably, the turbocharger 3 is a variable-capacity type supercharger having a variable nozzle provided on the turbine 3b. By using a variable-capacity type supercharger, the variable nozzle can be constricted when the engine 1 is operating in a low speed region to increase the turbine efficiency. The variable nozzle of the turbocharger 3 can be opened when the engine 1 is operating in a high speed region to increase the turbine capacity. Thus, this arrangement enables a high supercharging effect to be obtained over a wide range of operating conditions.

The exhaust system is also provided with a NOx trapping catalytic converter 13 having a NOx trapping function, and an exhaust gas fine particle capturing filter or diesel particulate filter (DPF) 14 arranged in sequence in this order from the upstream side to the downstream side at positions downstream of the turbine 3b of the turbocharger 3 in the exhaust passage 12. However, it is possible to reverse the positional relationship between the NOx trapping catalytic converter 13 and the diesel particulate filter 14 and to dispose the NOx trapping catalytic converter 13 on the downstream side of the diesel particulate filter 14. Alternatively, the diesel particulate filter 14 and NOx trapping catalytic converter 13 can be integrally structured arranged in either sequential order.

The NOx trapping catalytic converter 13 includes a catalyst that cleans by adsorbing or trapping NOx in the exhaust gas when the exhaust air-fuel ratio (the excess air ratio $\lambda$) is leaner than the theoretical (stoichiometric) air-fuel ratio, and releases the NOx when the exhaust air-fuel ratio (the excess air ratio λ) is richer than the stoichiometric air-fuel ratio. The NOx trapping catalytic converter 13 preferably includes an oxidation catalyst (Pt or another noble metal) for oxidizing HC and CO. Thus, the NOx trapping catalytic converter 13 has the characteristic of adsorbing exhaust HCs when the temperature is low and releasing the HCs when the temperature is high and it functions to oxidize HCs and CO when in an active state. The NOx trapping catalytic converter 12 also functions to deoxidize the NOx when in an active state.

The diesel particulate filter 14 captures fine exhaust particles or particulate matter (PM) contained in the exhaust gas and the captured particulate matter is combusted by raising the exhaust gas temperature using regeneration control. Thus, the diesel particulate filter 14 has a trap function for collecting fine particles or particulate matter (PM) contained in the exhaust gas. The diesel particulate filter 14 is one type of exhaust gas fine particle capturing filter or exhaust filter that can be used with the present invention. The captured particles in the diesel particulate filter 14 are combusted by raising the exhaust gas temperature using regeneration control. Preferably, the diesel particulate filter 14 includes an oxidation catalyst (noble metal) for oxidizing HC and CO.

The exhaust system is provided with an exhaust gas recirculation (EGR) control valve 19 that is installed in the EGR passage 11. The EGR control valve 19 serves to control the exhaust gas recirculation quantity in accordance with the engine operating conditions. The EGR control valve 19 is electronically controlled using a stepper motor such that the opening degree of the EGR control valve 19 regulates the flow rate of the exhaust gas recirculated to the air intake system, i.e., the EGR quantity drawn into the engine 1. The control valve 19 is preferably feedback (closed-loop) controlled to regulate the EGR quantity in such a manner as to achieve an EGR ratio set in accordance with the operating conditions.

An engine control unit (ECU) 25 is provided for controlling the engine 1 including controlling the exhaust gas cleaning operations of the present invention. In particular, the engine control unit 25 determines and sets the intake air quantity Qa, the fuel injection quantity Qf and the injection timing IT based on detection signals from various sensors (described below) that serve to detect the operating state of the engine 1 and executes the controls based on these signals as explained below. Thus, the engine control unit 25 also controls the drive of the fuel injection valves 10, controls the opening degree of the intake throttle valve 6 and the EGR control valve 19 in response to detection signals from various sensors (described below). Thus, detection signals from the sensors are input to the engine control unit 25 for controlling the engine 1.

The engine control unit 25 is a microcomputer comprising of a central processing unit (CPU) and other peripheral devices. The engine control unit 25 can also include other conventional components such as an input interface circuit, an output interface circuit, and storage devices such as a ROM (Read Only Memory) device and a RAM (Random Access Memory) device. The engine control unit 25 preferably includes an engine control program that controls various components as discussed below. The engine control unit 25 receives input signals from various sensors (described below) that serve to detect the operating state of the engine 1 and executes the aforementioned controls based on these signals. It will be apparent to those skilled in the art from this disclosure that the precise structure and algorithms for the engine control unit 25 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Basically, the engine control unit 25 is configured, as explained below such that at least one of parameters selected from among the target filter temperature, target exhaust air-fuel ratio, and target regeneration control time in the regeneration control for oxidizing particulate matter collected by the diesel particulate filter 14 is varied in accordance with a decrease associated with the regeneration control of the exhaust particulate matter collected by the exhaust filter. In particular, the particulate matters collected by the diesel particulate filter 14 are oxidized (combusted) more readily at a higher target filter temperature, leaner target exhaust air-fuel ratio, or longer target regeneration control time. Therefore, a possibility exists that the diesel particulate filter 14 may melt due to large quantities of the particulate matter being rapidly oxidized when conditions are set such that oxidation readily takes place at a stage in which the quantity of collected exhaust particulate matter is considerable. For this reason, at least one of the parameters selected from among the target filter temperature, the target exhaust air-fuel ratio, and the target regeneration control is varied in accordance with a decrease in the particulate matter due to regeneration control. As a result, regeneration can be performed with good efficiency while preventing the diesel particulate filter 14 from melting due to rapid combusting of large quantities of particulate matter.

The engine control unit 25 is also operatively coupled to an air-fuel ratio sensor 16, an exhaust pressure sensor 17, a rotational speed sensor (crank angle sensor) 20, an accelerator pedal position sensor 21, a catalyst temperature sensor 22 and a DPF temperature sensor 23.

The air-fuel ratio sensor 16 is configured and arranged to detect the exhaust air-fuel ratio on the exit side of the diesel particulate filter 14, and output a signal to the engine control unit 25 that is indicative of the exhaust air-fuel ratio on the exit side of the diesel particulate filter 14. The exhaust pressure sensor 17 is configured and arranged to detect the exhaust pressure on the entrance side of the diesel particulate filter 14 and output a signal to the engine control unit 25 that is indicative of the exhaust pressure on the entrance side of the diesel particulate filter 14. The rotational speed sensor (crank angle sensor) 20 is configured and arranged to detect the engine rotational speed Ne of the engine 1, and output a signal to the engine control unit 25 that is indicative of the engine rotational speed Ne of the engine 1. The accelerator pedal position sensor 21 is configured and arranged to detect the accelerator position APO, and output a signal to the engine control unit 25 that is indicative of the accelerator position APO. The catalyst temperature sensor 22 is configured and arranged to detect the temperature of the NOx trapping catalytic converter 13, and output a signal to the engine control unit 25 that is indicative of the temperature of the NOx trapping catalytic converter 13. The DPF temperature sensor 23 is configured and arranged to detect the temperature of the diesel particulate filter 14, and output a signal to the engine control unit 25 that is indicative of the temperature of the diesel particulate filter 14.

Alternatively, the temperatures of the NOx trapping catalytic converter 13 and the diesel particulate filter 14 can be estimated by disposing exhaust temperature sensors downstream therefrom, and basing the estimation on the exhaust temperature detected by the exhaust temperature sensors.

The engine control unit 25 outputs a fuel injection command signal to the fuel injection valves 10 for controlling the fuel injection quantity Qf and the fuel injection timing IT, an opening command signal to the air intake throttle 6, and an opening command signal to the EGR control valve 19. In other words, the engine control unit 25 controls the fuel injection quantity Qf delivered by the fuel injection valves 10, the fuel injection timing IT of the fuel injection valves 10 in accordance with various engine operating conditions. The engine control unit 25 also controls the opening degrees of the air intake throttle 6 and the EGR control valve 19 in accordance with various engine operating conditions.

The engine control unit 25 is configured so as to carry out regeneration processing for the NOx trapping catalytic converter 13 and the diesel particulate filter 14 (exhaust cleaning device), and functions as a regeneration control system. In particular, the engine control unit 25 further controls the regeneration of the NOx trapping catalytic converter 13 by determining when the total NOx absorbed to the NOx trapping catalytic converter 13 has reacted a prescribed value and, when the prescribed value is reached, executing regeneration control to shift the excess air ratio $\lambda$ to a rich value and thereby desorb and deoxidize the NOx. The engine control unit 25 further controls the regeneration of the NOx trapping catalytic converter 13 by desulfating the NOx trapping catalytic converter 13 in a high temperature and rich atmosphere. The engine control unit 25 further controls the regeneration of the exhaust gas fine particle capturing filter 14 by executing regeneration control to raise the exhaust gas temperature and thereby combust/remove the particulate matter when the amount of particulate matter captured in the diesel particulate filter 14 has reached a prescribed amount. In other words, the above-described regeneration processing includes processing for oxidizing particulate matter PM accumulated in the diesel particulate filter 14 in a high temperature and lean atmosphere, processing for eliminating and reducing NOx accumulated in the NOx trapping catalytic converter 13 in a rich atmosphere, and processing for desulfating the NOx trapping catalytic converter 13 in a high temperature and rich atmosphere.

In the engine 1 of the present embodiment, the configuration performs a preliminary injection before the main injection in order to ease the initial rapid combustion during regular driving in a lean condition. Here, the preliminary injection timing is set to about 40 to 10° BTDC, the preliminary injection amount to about 1 to 3 mm³/st, the main injection timing to 10 to −20° BTDC, and the interval between the preliminary and the main injections to about 10 to 30° CA (crank angle).

On the other hand, during regeneration of the diesel particulate filter 14 and the NOx trapping catalytic converter 13 required by the use of a richer air-fuel mixture and/or high exhaust temperature, the system is configured so as to switch to a staged retarded combustion, which is a combustion mode for regeneration that is different from the regular combustion mode.

In the setting for the preliminary injection in the combustion mode during regular driving, the compression end temperature decreases when the air intake amount is restricted in order to form a richer air-fuel mixture. For this reason, even if an attempt is made to retard the injection timing of the main injection, which creates a richer mixture and simultaneously raises the exhaust temperature, the timing cannot be retarded as required, making it impossible to perform the operation required for desulfation, for example, one performed at an excess air ratio $\lambda$ of 1 or greater and an exhaust temperature of 600° C. or greater.

In view of the above, the present invention is configured to switch to staged retarded combustion, which is different from the regular combustion mode, and to bring about the required rich air-fuel ratio and/or high exhaust temperature when DPF regeneration or the like is required.

In staged retarded combustion, the fuel injection is controlled so as to perform preliminary combustion, which is performed at least once in the vicinity of the top dead center, and the main combustion, which generates main torque and is started after preliminary combustion is completed.

Figure 2:
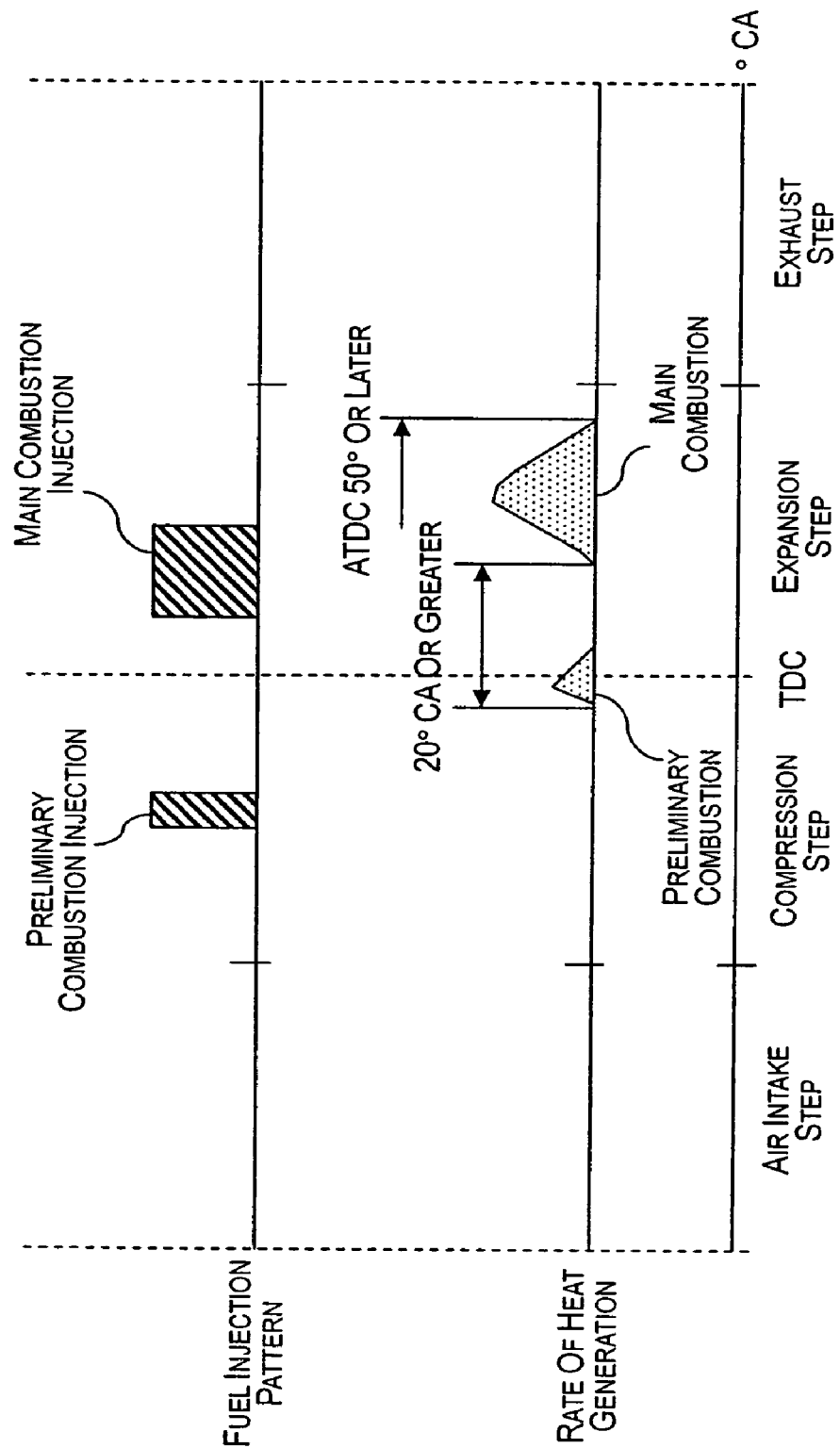
FIG. 2 is a diagram showing the injection and combustion patterns of staged retarded combustion (regeneration combustion mode) in accordance with the embodiments of the present invention.

FIG. 2 shows the fuel injection pattern and the rate of heat release in staged retarded combustion. In staged retarded combustion, the fuel is first injected in the compression step, and the preliminary combustion is performed in order to increase the temperature within the cylinder in the vicinity of the compression top dead center (TDC).

The injection amount in fuel injection for the preliminary combustion in the compression step is an amount required to set the temperature within the cylinder during fuel injection for the main combustion higher than the temperature at which self-ignition is possible.

The action of retarding the main combustion can be promoted by increasing the temperature within the cylinder by the preliminary combustion in the vicinity of the top dead center. The preliminary combustion stage of staged retarded combustion can be performed a plurality of times in one cycle, and the combustion injection is performed so that at least one of the plurality of preliminary combustions occurs in the vicinity of the compression top dead center.

Also, the preliminary combustion stage of staged retarded combustion can be performed such that the compression end temperature within the cylinder is estimated based on the operating state (engine speed Ne, fuel injection quantity, and the like) of the engine 1, and the fuel injection and/or the injection timing for the preliminary combustion is varied in accordance with the compression end temperature.

On the other hand, in staged retarded combustion, the fuel for the main combustion is injected at the top dead center or later so that the main combustion starts after the preliminary combustion is completed. Injection timing for the main combustion is controlled so that the combustion start timing for the main combustion is separated by a crank angle of 20° or greater from the initial combustion timing for the preliminary combustion. The premixed combustion ratio of the main combustion can thereby be set high, and exhaust smoke can be inhibited. The combustion completion timing for the main combustion in staged retarded combustion is controlled so that the timing is separated by a crank angle of 50° or greater from the compression top dead center.

In staged retarded combustion composed of preliminary and main combustions, controllability in the direction of the target exhaust temperature can be improved by widening the retardation limit of the main combustion by using the preliminary combustion. Also, it is possible to control the increase of smoke with a richer air-fuel ratio by increasing the premixed combustion ratio of the main combustion so that the main combustion starts after preliminary combustion is complete.

Figure 3:
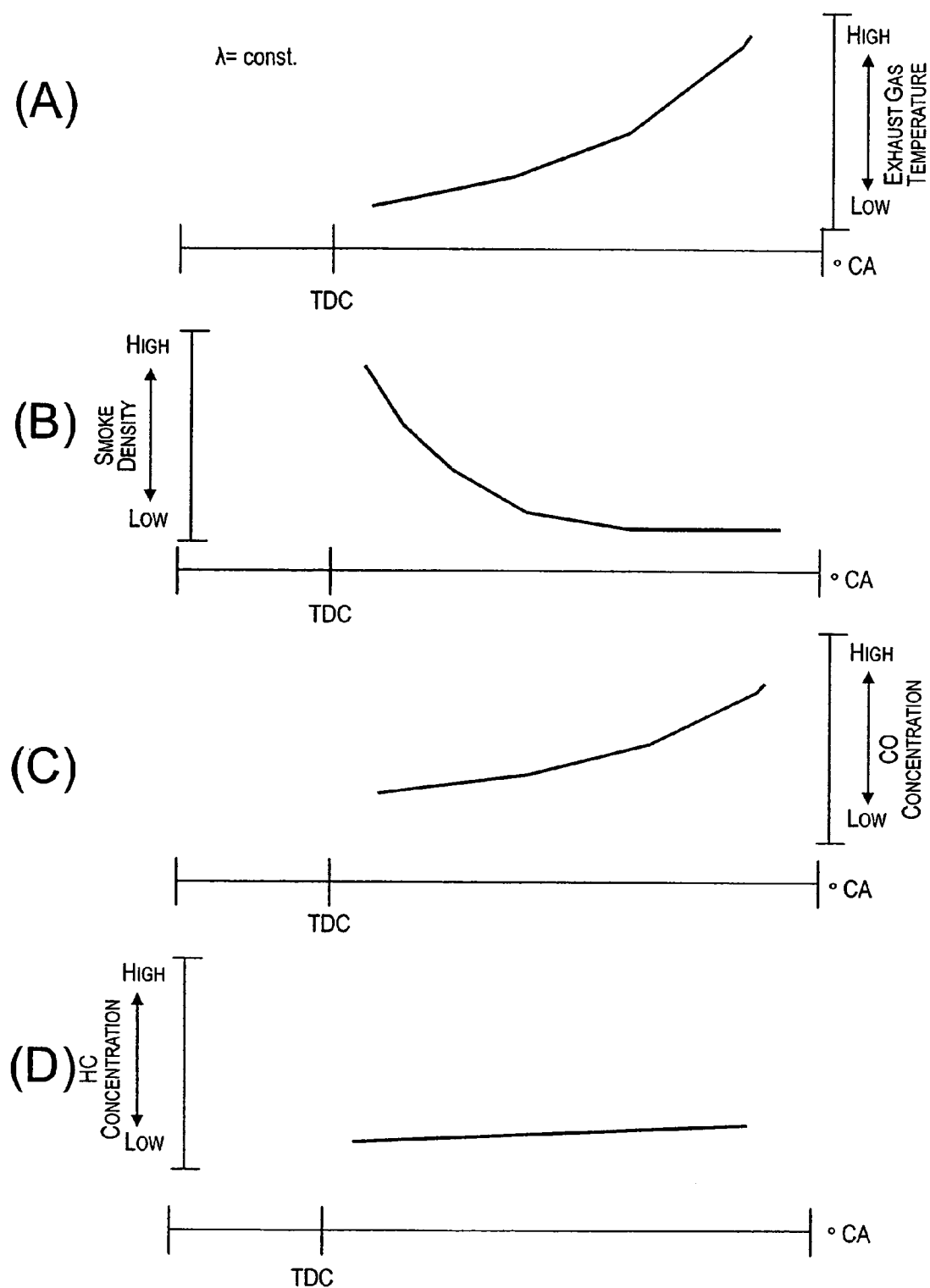
FIG. 3 is a diagram showing the characteristics of exhaust gas in relation to the main combustion timing of staged retarded combustion in accordance with the embodiments of the present invention.

FIG. 3 is a diagram showing the state of exhaust gas in relation to the main combustion timing of staged retarded combustion; wherein graph (A) shows the exhaust temperature, graph (B) shows the smoke density, graph (C) shows the CO (carbon monoxide) concentration, and graph (D) shows the HC concentration.

As shown in this diagram, smoke is inhibited and the exhaust temperature simultaneously increases in association with the action of retarding the main combustion because when the timing of the main combustion is retarded, the premixed combustion ratio of the main combustion increases by a corresponding amount.

Figure 4:
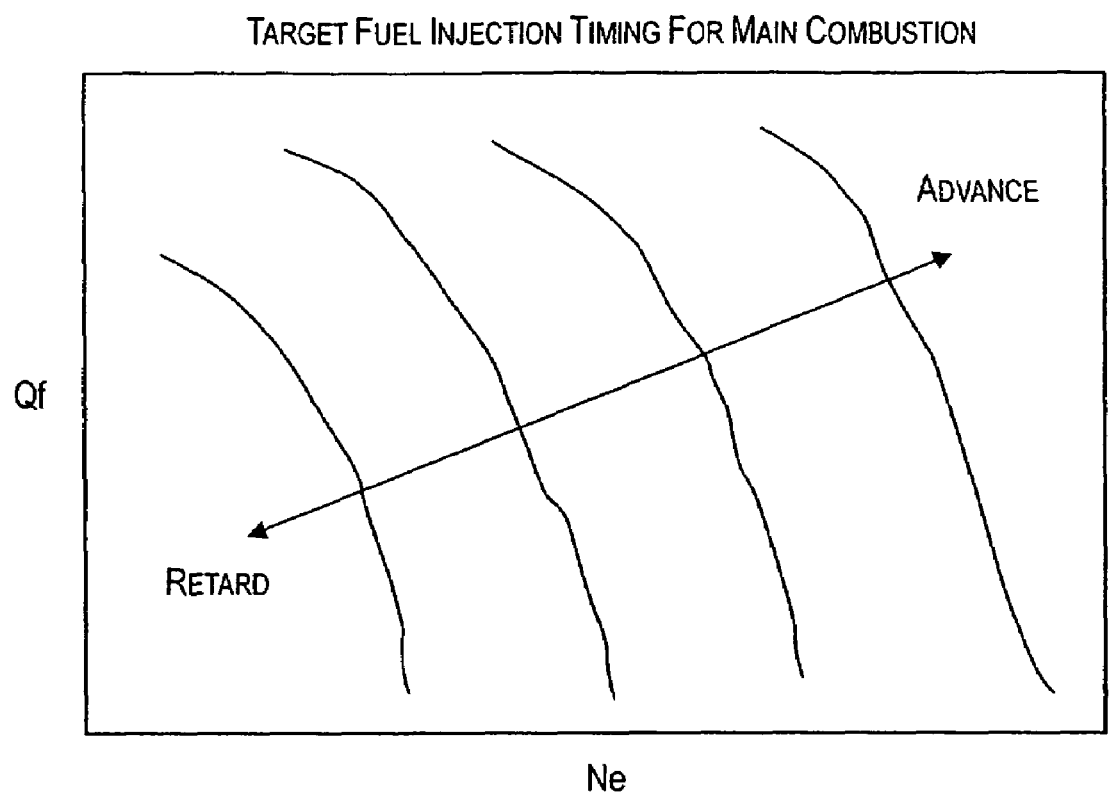
FIG. 4 is a diagram showing the characteristics of injection timing for the main combustion of staged retarded combustion in accordance with the embodiments of the present invention.
Figure 5:
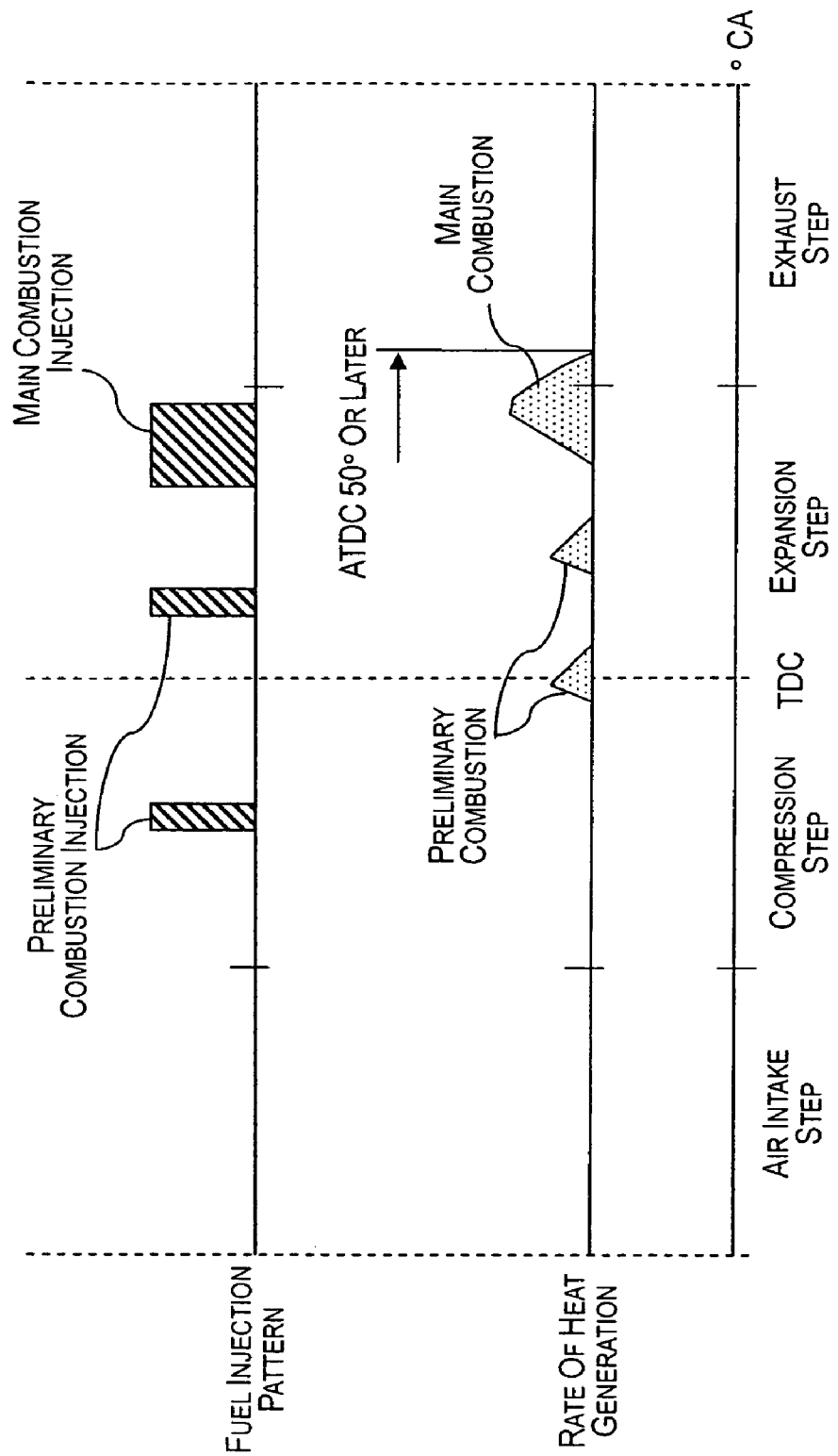
FIG. 5 is a diagram showing the injection pattern and the combustion pattern for staged retarded combustion in accordance with the embodiments of the present invention.

FIG. 4 is a diagram showing the target fuel injection timing for the main combustion, wherein the horizontal axis shows the engine speed Ne, and the vertical axis shows the fuel injection quantity Qf. As shown in the diagram, the main combustion must be considerably retarded in order to achieve the target temperature in a low-load, low-speed range, and there can be cases in which the temperature within the cylinder during the fuel injection for the main combustion cannot be kept high. In such a case, it is possible to cause the main combustion to be retarded to a timing whereby the required high exhaust temperature can be achieved even in a low-load, low-speed condition, by carrying out preliminary combustion a plurality of times so that the heat generation of individual cycles does not overlap, as shown in FIG. 5.

Figure 6:
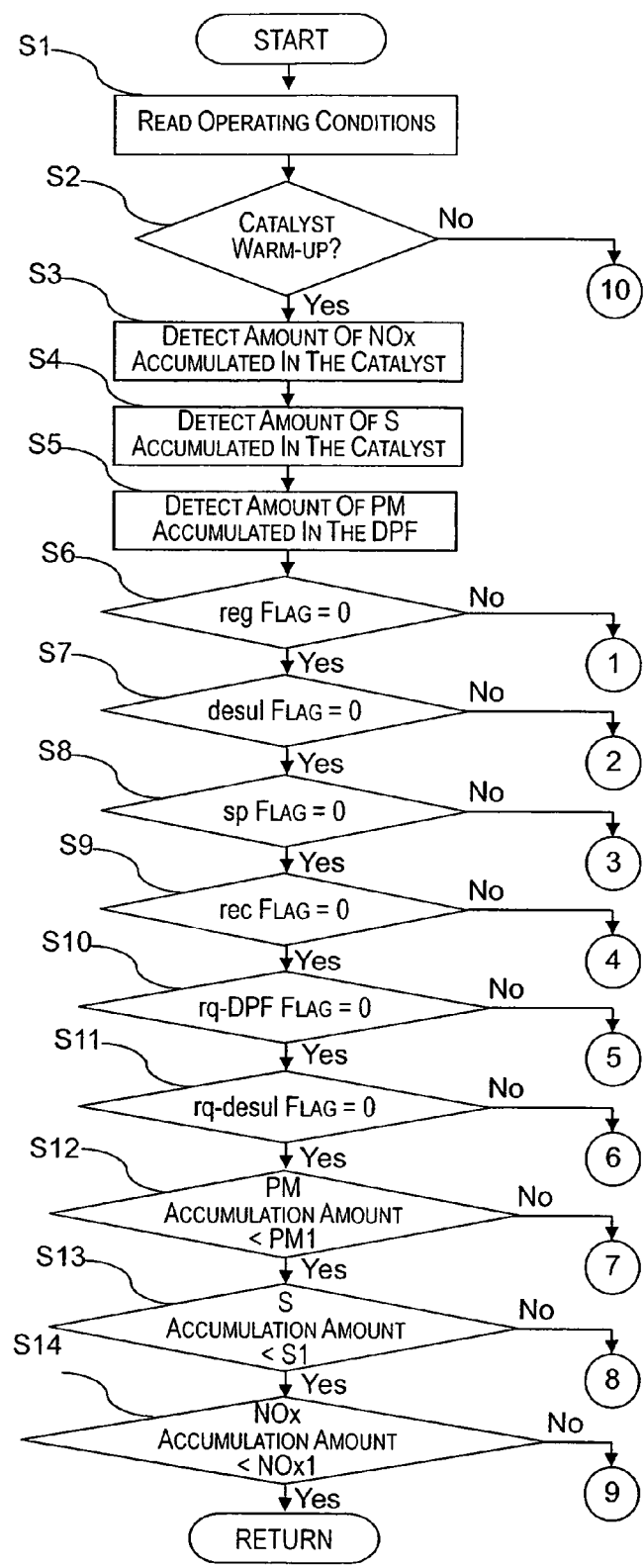
FIG. 6 is a flowchart showing the main routine for regeneration control in accordance with the embodiments of the present invention.

Next, the details of regeneration control for the diesel particulate filter 14 and the NOx trapping catalytic converter 13 are described based on the flowcharts in FIGS. 6 to 17. These control routines of FIGS. 6 to 17 are periodically executed in a cyclic manner at a prescribed fixed time interval when the engine 1 is operating in accordance with certain predetermined engine operating conditions. FIG. 6 is a flowchart showing the main routine for the regeneration control.

In step S1, the control unit 25 reads in various signals from each of the sensors shown in FIG. 1 that represent operating conditions of the engine and other components including, but not limited to, the engine speed Ne, the accelerator pedal opening APO, temperature of the NOx trapping catalytic converter 13, the exhaust pressure at the entrance and exit of the diesel particulate filter 14, the temperature of the diesel particulate filter 14, and other operating data. Also read in step S1 is the fuel injection quantity Q computed from a map in which the engine speed Ne and the accelerator pedal opening APO are parameters. In other words, the engine operating state, e.g., load condition and rotational speed condition, of the engine 1 and the operating conditions of the NOx trapping catalytic converter 13 and the diesel particulate filter 14 are determined by the control unit 25 by receiving signals from each of the sensors shown in FIG. 1.

In step S2, a determination is made as to whether the NOx trapping catalytic converter 13 is activated (warmed). This determination is made by determining whether the exhaust temperature T calculated based on the output signal of the exhaust temperature sensor 15 at the exit of the NOx trapping catalytic converter 13 is higher than a predetermined exhaust temperature T5 at the start of activation of the NOx trapping catalytic converter 13. When the exhaust temperature T is higher than the predetermined exhaust temperature T5, it is concluded that the NOx trapping catalytic converter 13 is in an activated state, and the system proceeds to step S3. On the other hand, when the exhaust temperature T is equal to or less than the predetermined exhaust temperature T5, it is concluded that the NOx trapping catalytic converter 13 is in a non-activated state, and the system moves to step S1001 in FIG. 16. Control for promoting the activation of the NOx trapping catalytic converter 13 is carried out in step S1001 and thereafter, but this control is described hereinafter.

In step S3, the amount of NOx accumulated in the NOx trapping catalytic converter 13 is estimated. The amount of NOx can be estimated based on the cumulative value of the distance traveled by the vehicle and the engine speed Ne. The estimation results of the NOx amount are reset when the NOx desorption/reduction is completed (including the case in which the NOx is simultaneously desorbed/reduced by desulfation).

In step S4, the amount of sulfur content (Sox) accumulated in the NOx trapping catalytic converter 13 is estimated. The sulfur deposit can be estimated based on the cumulative value of the traveled distance and the engine speed Ne in the same manner as the amount of NOx described above, and the estimation result is reset when desulfation is complete.

In step S5, the amount of particulate matter PM accumulated in the diesel particulate filter 14 is estimated. The amount of particulate matter PM accumulated is estimated by comparing the exhaust pressure at the entrance of the diesel particulate filter 14 detected by the exhaust pressure sensor 17 and a reference exhaust pressure in accordance with the current operating state (the engine speed Ne and the fuel injection quantity Qf). The amount of particulate matter PM accumulated can be estimated based on the cumulative value of the engine speed Ne or the distance traveled since the diesel particulate filter 14 was last regenerated. It is furthermore possible to estimate the accumulated amount of particulate matter PM from a combination of the exhaust pressure and the cumulative value of the engine speed Ne or the traveled distance.

In step S6, a determination is made as to the reg flag indicating whether the diesel particulate filter 14 is in the regeneration mode (oxidation of particulate matter PM). The system proceeds to step S7 if the reg flag=0 and the diesel particulate filter 14 is not in the regeneration mode. On the other hand, when the reg flag=1 and the diesel particulate filter 14 is in the regeneration mode, the system performs the DPF regeneration mode processing shown in the flowchart in FIG. 7.

In step S7, a determination is made as to the desul flag indicating whether the NOx trapping catalytic converter 13 is in the desulfation mode. The process moves to step S7 if the desul flag=0 and the system is not in the desulfation mode. On the other hand, when the desul flag=1 and the system is in the desulfation mode, the system performs the desulfation mode processing shown in the flowchart in FIG. 8.

In step S8, a determination is made as to the sp flag indicating whether the system is in the rich spike mode for temporarily lowering the exhaust air-fuel ratio in order to desorb/reduce accumulated NOx in the NOx trapping catalytic converter 13.

The process moves to step S9 if the sp flag=0 and the system is in the rich spike mode. When the sp flag=1 and the system is in the rich spike mode, the system performs the rich spike mode processing shown in the flowchart in FIG. 9.

In step S9, a determination is made as to the rec flag indicating whether the system is in the melt prevention mode following the DPF regeneration or the desulfation mode.

The process moves to step S10 if the rec flag=0 and the system is in the melt prevention mode. On the other hand, when the rec flag=1 and the system is in the melt prevention mode, the system performs the melt prevention mode processing shown in the flowchart in FIG. 10.

In step S10, a determination is made as to the rq-DPF flag indicating whether a DPF regeneration request has been issued.

The process moves to step S11 if the rq-DPF=0 and the system has not issued a DPF regeneration request. On the other hand, when the rq-DPF flag=1 and the system has issued a DPF regeneration request, the process moves to the regeneration mode in accordance with the priority level, as shown in the flowchart in FIG. 11.

In step S11, a determination is made as to the state of the re-desul flag indicating whether a request to desulfate the NOx trapping catalytic converter 13 has been issued. The process moves to step S12 if the re-desul flag=0 and a poison release request has not been issued. On the other hand, when the re-desul flag=1 and the system has issued a desulfation request, the process moves to the regeneration mode in accordance with the priority level, as shown in the flowchart in FIG. 12.

In step S12, a determination is made as to whether the PM accumulation amount in the diesel particulate filter 14 calculated in step S4 has reached the predetermined amount PM1 requiring regeneration; that is, whether the DPF regeneration timing has arrived.

The process moves to step S13 if is has been determined that the PM accumulation amount<PM1 and the DPF regeneration timing has not arrived. On the other hand, when is has been determined that the PM accumulation amount>PM1 and the DPF regeneration timing has arrived, the process moves to step S701 in the flowchart in FIG. 13, the rq-DPF flag is set to 1, and a DPF regeneration request is issued.

In step S13, a determination is made as to whether the sulfur accumulation amount in the NOx trapping catalytic converter 13 calculated in step S4 has reached the predetermined amount S1 (poison release request) and whether regeneration timing has arrived; that is, whether a request for desulfation is required.

When the sulfur accumulation amount is less than the predetermined amount S1, it is determined that a request for desulfation is not required, and the process moves to step S14. On the other hand, when the sulfur accumulation amount S is equal to or greater than the predetermined amount S1, it is determined that desulfation is required, the process moves to step S801 in the flowchart in FIG. 14, the rq-desul flag (desulfation request flag) is set to 1, and a request for desulfation is issued.

In step S14, a determination is made as to whether the NOx accumulation amount in the NOx trapping catalytic converter 13 calculated in step S3 has reached a predetermined amount NOx1 (NOx desorption/reduction request level), and NOx desorption/reduction timing has arrived.

When the NOx accumulation amount is less than the predetermined amount NOx1, the main routine is ended without further branching. On the other hand, when the NOx accumulation amount is equal to or greater than the predetermined amount NOx1, it is determined that NOx desorption/reduction is required, the rw-sp flag is set to 1 in step S901 in the flowchart in FIG. 15, and an NOx desorption/reduction request is issued.

Next, the DPF regeneration processing performed when it has been determined in step S6 that reg flag=1 is described in detail with reference to the flowchart in FIG. 7.

In step S101, staged retarded combustion, composed of preliminary combustion, which is performed at least once in the vicinity of the top dead center, and main combustion, which generates main torque and is initiated after the preliminary combustion has been completed, is switched based on the DPF regeneration request.

Figure 17:
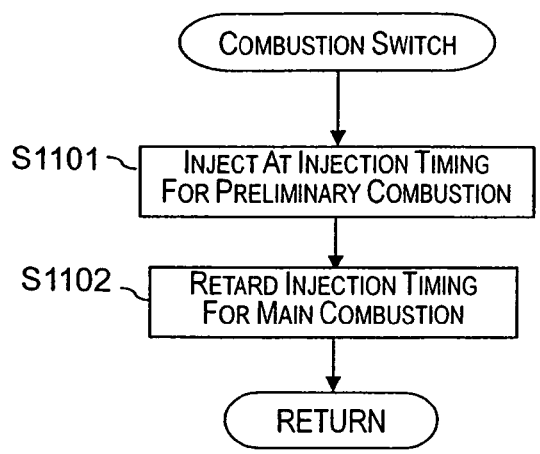
FIG. 17 is a flowchart showing the control process for switching combustion modes in accordance with the embodiments of the present invention.

When an instruction to switch combustion modes is issued, the combustion switch is performed as shown in the flowchart in FIG. 17. All cases in which an instruction for a combustion switch is issued, the combustion switch is carried out with the processing shown in the flowchart in FIG. 17.

Figure 18:
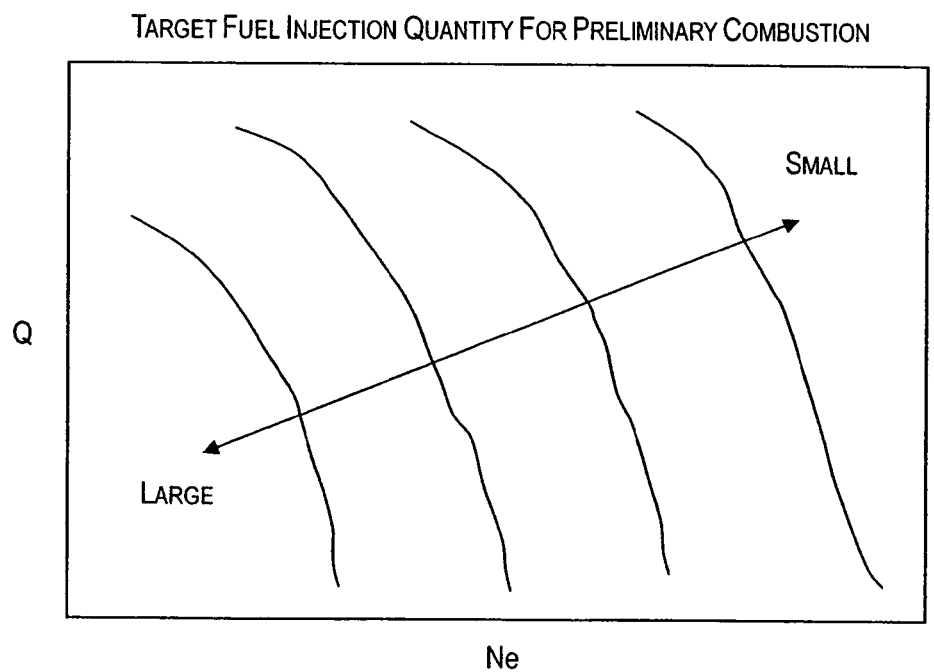
FIG. 18 is a diagram showing the characteristics of target injection quantity for the preliminary combustion stage of staged retarded combustion in accordance with the embodiments of the present invention.
Figure 19:
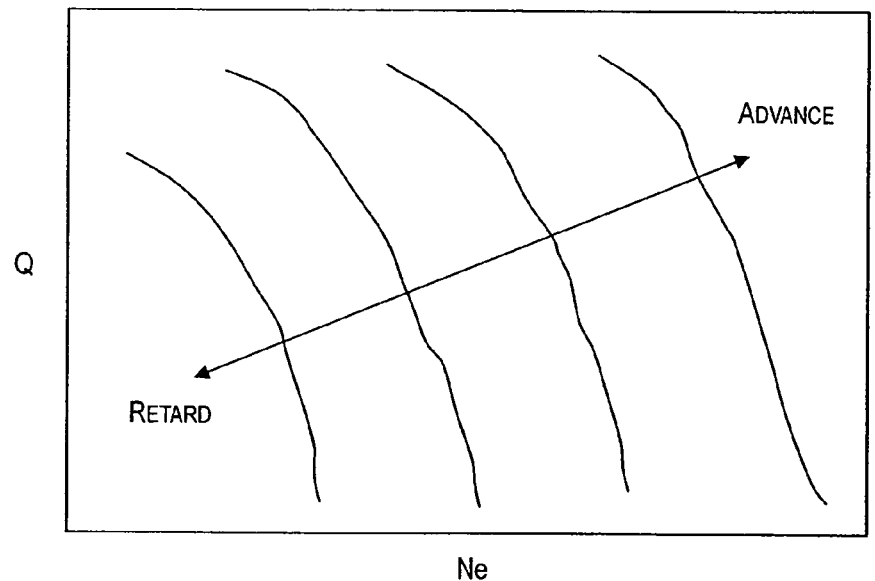
FIG. 19 is a diagram showing the characteristics of target injection timing for the preliminary combustion stage of staged retarded combustion in accordance with the embodiments of the present invention.

In step S1101, the fuel injection quantity for the preliminary combustion is set in accordance with the current engine speed Ne and the fuel injection quantity Q, as shown in FIG. 18; the injection timing for the preliminary combustion is set in accordance with the current engine speed Ne and the fuel injection quantity Q, as shown in FIG. 19; and the fuel injection quantity is injected at the injection timing to cause preliminary combustion to occur.

Figure 20:
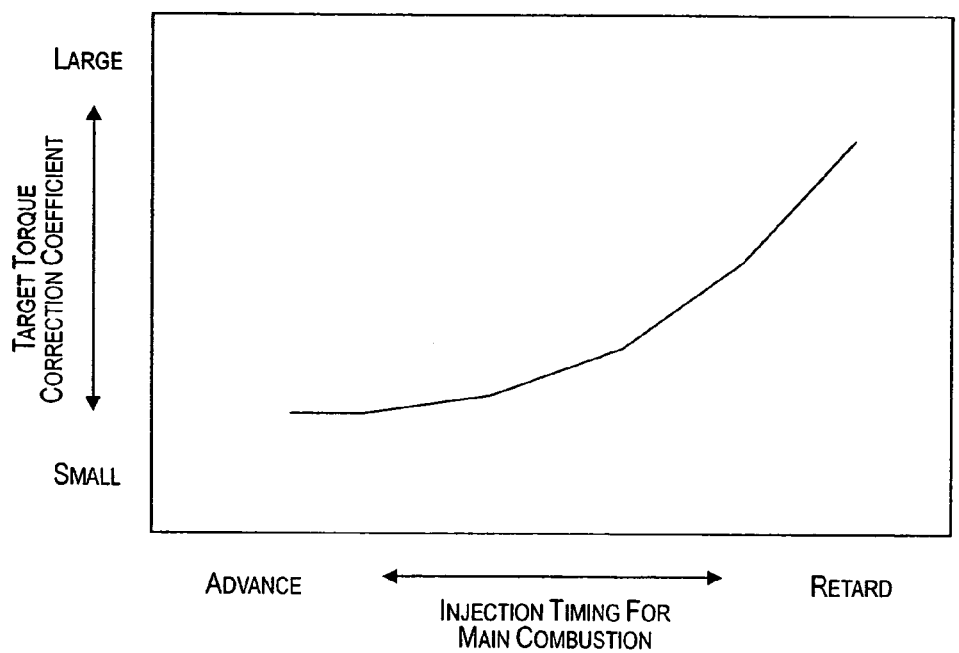
FIG. 20 is a diagram showing the correlation between the torque correction coefficient and the injection timing for the main combustion of staged retarded combustion in accordance with the embodiments of the present invention.

In the subsequent step S1102, the injection timing for the main combustion is set in accordance with the current engine speed Ne and the fuel injection quantity Q, and the injection timing for the main combustion is gradually caused to be retarded toward injection timing, as shown in FIG. 4. Here, the quantity resulting from multiplying the normal fuel injection quantity by the correction coefficient, which is designed to correct the injection quantity by increasing it to a greater degree as the injection timing for the main combustion becomes more retarded, is set as the injection quantity for the main combustion; fuel is increased in accordance with the retarding of the injection timing for the main combustion; and torque that is equivalent to that in regular combustion mode is obtained, as shown in FIG. 20.

Figure 21:
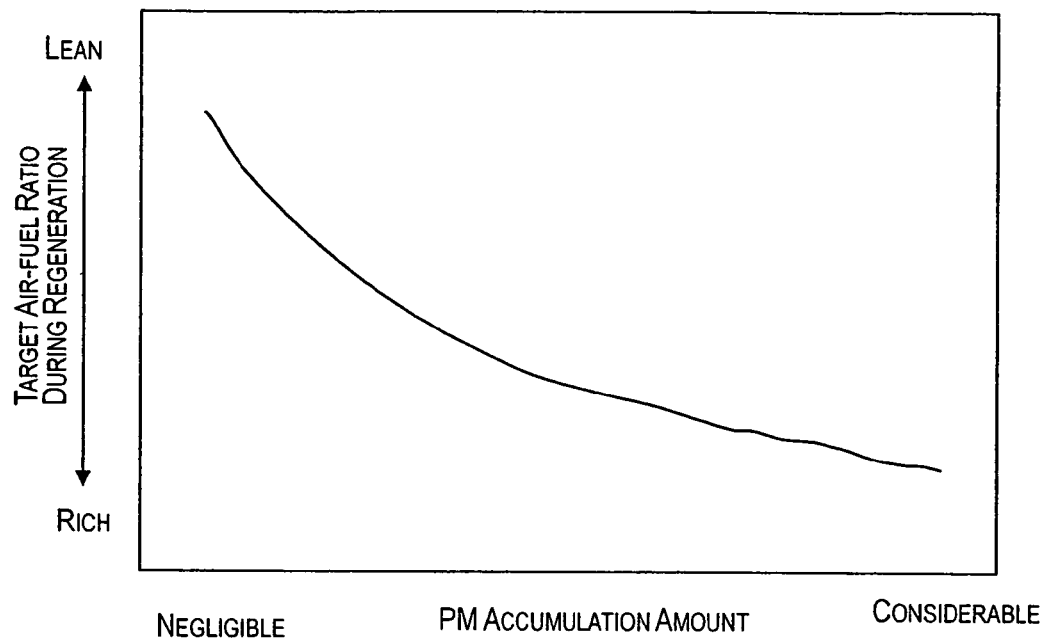
FIG. 21 is a diagram showing the correlation between the target air-fuel ratio during DPF regeneration and the particulate matter PM accumulation amount in accordance with the embodiments of the present invention.

In step S102, the air-fuel ratio is kept at the target level for DPF regeneration. The air-fuel ratio is kept at the target level by controlling the exhaust reflux amount and/or the air intake throttle with the air intake throttle valve. The initial value of the target air-fuel ratio is set in accordance with the PM accumulation amount, as shown in FIG. 21.

Figure 22:
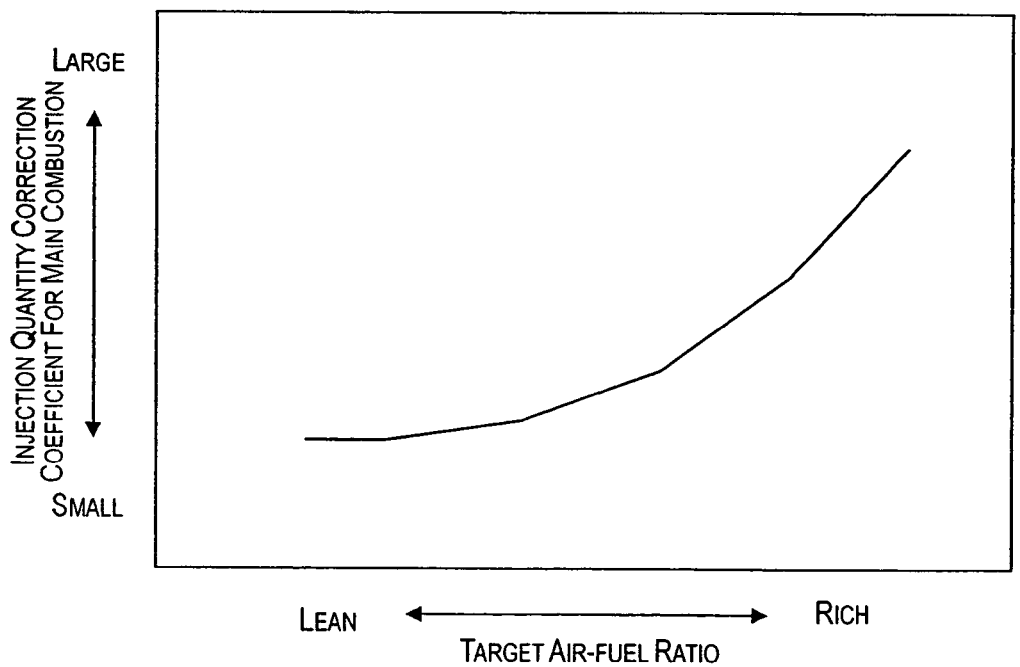
FIG. 22 is a diagram showing the correlation between the correction coefficient of the injection quantity for the main combustion and the target air-fuel ratio of staged retarded combustion in accordance with the embodiments of the present invention.

Also, the fuel injection quantity for the main combustion is corrected with the correction coefficient that corresponds to the target air-fuel ratio, as shown in FIG. 22, because air intake throttling causes a pumping loss.

Figure 24:
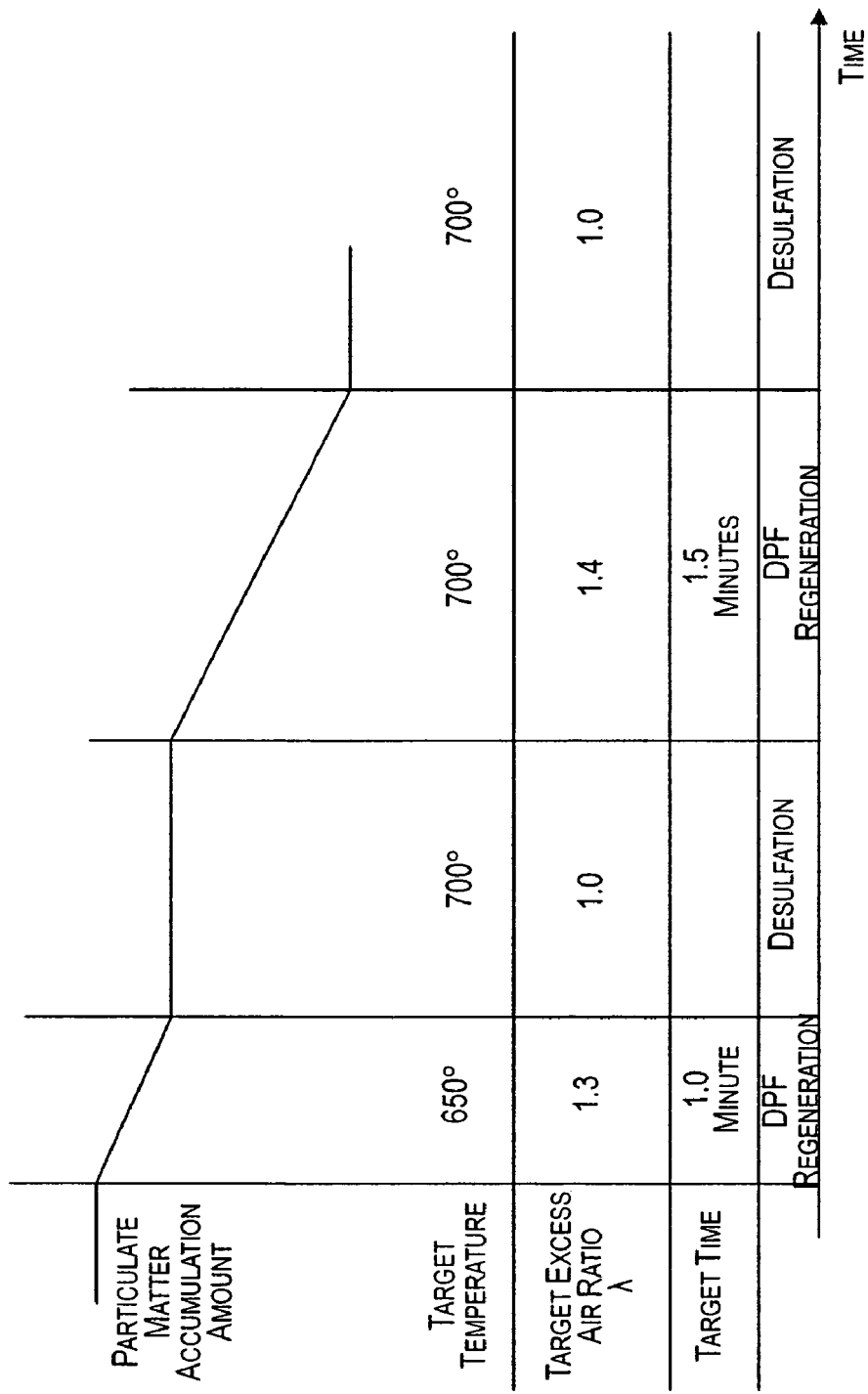
FIG. 24 is a diagram showing the manner in which the target exhaust air-fuel ratio, target filter temperature, and target regeneration control time in DPF regeneration vary when DPF regeneration and desulfation are alternately repeated in accordance with the embodiments of the present invention.

In the present embodiment the diesel particulate filter 14 is regenerated and the NOx trapping catalytic converter 13 is desulfated in a continuous alternating fashion when there is a request to regenerate the diesel particulate filter 14 regeneration and to desulfate the NOx trapping catalytic converter 13, as shown in FIG. 24; and the target filter temperature, the target exhaust air-fuel ratio, and the target regeneration control time (processing time per cycle) in the DPF regeneration processing are set for each cycle of DPF regeneration processing, that is to say, in accordance with the decrease of the particulate matter PM due to regeneration.

More specifically, in the initial DPF regeneration processing, the target filter temperature is set to 650°, the target exhaust air-fuel ratio is set to 1.3 in terms of the excess air ratio λ, and the target regeneration processing control time (processing time tDPFreg1) is set to 1 minute, but when the next cycle of DPF regeneration is performed with an intervening cycle of desulfation processing, the target filter temperature is set to 700°, the target exhaust air-fuel ratio is set to 1.4 in terms of the excess air ratio λ, and the target regeneration processing control time is set to 1.5 minutes. In other words, as the number of cycles of DPF regeneration processing increases, the target filter temperature (target upper limit T21) is increased, the target exhaust air-fuel ratio is made leaner, and the target regeneration processing control time is increased.

Here, the higher the target filter temperature is, the leaner the target exhaust fuel-air ratio is, and the longer the target regeneration processing control time is, the easier it is to oxidize (combustion) the exhaust particulate matter PM collected in the diesel particulate filter 14.

When a large amount of exhaust particulate matter PM is collected in the diesel particulate filter 14, there is a possibility that the diesel particulate filter 14 will melt due to rapid oxidation of a large amount of exhaust particulate matter PM when the conditions are set so as to facilitate oxidation.

In view of the above, when a large amount of exhaust particulate matter PM has been collected and DPF regeneration processing is performed the first time, the rapid oxidation (combustion) of a large amount of exhaust particulate matter PM can be avoided by setting the target filter temperature (target upper limit T21) relatively low, making the target exhaust air-fuel ratio relatively rich, and reducing the target regeneration processing control time.

Also, the exhaust particulate matter PM can be efficiently oxidized if the diesel particulate filter 14 is not melted in conditions in which the exhaust particulate matter PM is readily oxidized. This can be achieved by adopting a procedure in which it is determined that the remaining amount of exhaust particulate matter PM is decreasing in accordance with the increasing number of DPF regeneration cycles (that is to say, in accordance with the passage of time during the DPF regeneration processing), and in which the target filter temperature (target upper limit T21) is set to a higher level, the target exhaust air-fuel ratio is made leaner, and the regeneration processing control time is extended.

In step S103, a determination is made as to whether the temperature of the diesel particulate filter 14 is equal to or greater than the target lower limit T22 during regeneration. When the DPF temperature is equal to or greater than the target lower limit T22, the process moves to step S106. On the other hand, when the DPF temperature is less than the target lower limit T22, the process moves to step S104.

In step S104, the fuel injection timing for the main combustion is retarded in order to raise the DPF temperature to a temperature that is equal to or greater than the target lower limit T22.

In the subsequent step S105, a torque correction (correction to increase the fuel injection quantity for the main combustion) is performed to compensate for a drop in torque due to the action of retarding of the fuel injection timing.

In step S106, a determination is made as to whether the temperature of the diesel particulate filter 14 is equal to or less than the target upper limit T21 during regeneration. The target upper limit T21 is a value that is set in accordance with the cumulative number of times the DPF regeneration processing has taken place, that is to say, in accordance with the decrease in the collected amount of exhaust particulate matter PM. When the DPF temperature is equal to or less than the target upper limit T21, the process moves to step S109. On the other hand, when the DPF temperature has exceeded the target upper limit T21, the process moves to step S107, the fuel injection timing for the main combustion is advanced, the exhaust temperature is thereby reduced, and the DPF temperature is made to be equal to or less than the target upper limit T21.

In the subsequent step S108, a torque correction (correction to reduce the fuel injection quantity for the main combustion) is performed in order to offset an increase in torque due to the advanced fuel injection timing.

In step S109, a determination is made as to whether the time for DPF regeneration processing has reached the target regeneration control time tDPFreg1.

When it has been determined that the target regeneration control time tDPFreg1 has elapsed, the process moves to step S110 in order to switch from DPF regeneration to processing for the desulfation of the NOx trapping catalytic converter 13.

In step S110, the desul flag is set to 1.

In the subsequent step S111, the target exhaust air-fuel ratio is corrected to a leaner setting than the current setting in order to make the exhaust air-fuel ratio leaner during the next cycle of DPF regeneration.

In step S112, the target regeneration control time tDPFreg1 is corrected to a longer setting than the current setting in order to increase the processing time during the next cycle of DPF regeneration.

In step S113, the target upper limit T21 is corrected to a higher setting than the current setting in order to make the DPF temperature higher during the next cycle of DPF regeneration.

In step S114, the reg flag is reset to 0 in order to temporarily stop DPF regeneration processing.

In step S115, a determination is made as to whether the regeneration processing of the diesel particulate filter 14 has finally completed by determining whether the target regeneration control time tDPFreg1 that was corrected and set in step S112 has exceeded a reference time t2. The target regeneration control time tDPFreg1 is set to a higher value each time DPF regeneration is repeated, so the cumulative number of DPF regeneration cycles, hence, the total time of DPF processing can be determined by making a determination as to whether the target regeneration control time tDPFreg1 has exceeded the reference time t2. Completion of the DPF regeneration processing can be determined based on the repeated number of DPF regeneration cycles (number of times executed), the total time the DPF processing has been performed, the target air-fuel ratio corrected to the lean side at each repetition, or the target filter temperature (target upper limit T21) that is set to a higher level at each repetition.

If the target regeneration control time tDPFreg1 that has been corrected and set in step S112 exceeds the reference time t2 in step S115, and it is estimated that regeneration processing for the diesel particulate filter 14 has been completed, the process moves to step S116 and the system is returned from staged retarded combustion for regeneration to regular combustion.

Also, in the subsequent step S117, the reg flag is set to 0; and in step S118, the rec flag in the melt prevention mode is set to 1 to prevent the unburned particulate matter PM from burning all at once in the diesel particulate filter 14 and melting the diesel particulate filter 14.

Desulfation of the NOx trapping catalytic converter 13, which is performed when it has been determined that desul flag=1 in step S7, will now be described in detail with reference to the flowchart in FIG. 8.

In step S201, a switch to staged retarded combustion is made based on the issuance of a request for desulfation.

In step S202, the air-fuel ratio is brought to the stoichiometric value (theoretical air-fuel ratio) in order to perform desulfation.

The air-fuel ratio is controlled with the air-intake throttle valve 6 and the EGR control valve 19 in the same manner as during DPF regeneration.

In step S203, a determination is made as to whether the temperature of the NOx trapping catalytic converter 13 is higher than a predetermined temperature T4. For example, when a Ba-based NOx trapping catalytic converter is used as the NOx trapping catalytic converter 13, the predetermined temperature T4 is set to 600° C. or higher because the temperature of the NOx trapping catalytic converter 13 in environments that range from rich to stoichiometric must be higher than 600° C.

When the catalyst temperature is higher than the predetermined temperature T4, the process moves to step S206. On the other hand, when the catalyst temperature is the predetermined temperature T4 or less, the process moves to steps S204 and S205.

Figure 7:
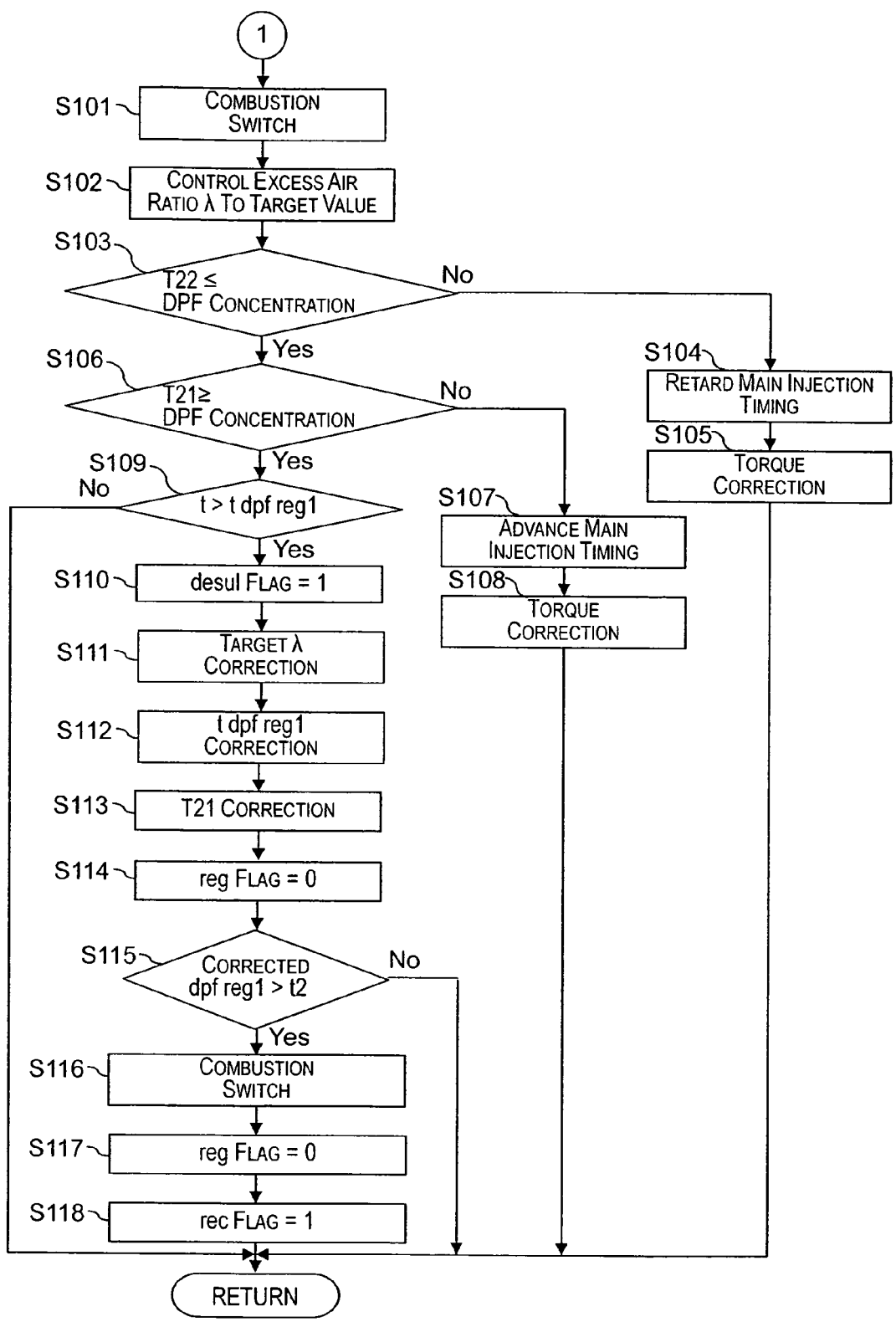
FIG. 7 is a flowchart showing processing for DPF regeneration in accordance with the embodiments of the present invention.

When the process has moved to steps S204 and S205, the same processing as in steps S104 and S105 in the flowchart in FIG. 7 is carried out. In other words, in step S204, the fuel injection timing for the main combustion is retarded and the exhaust temperature is increased because the temperature of the NOx trapping catalytic converter 13 is equal to or less than the predetermined temperature T4.

In step S205, the decrease in torque due to retarding action is compensated for with an increase in the injection quantity for the main combustion. On the other hand, a determination is made in step S206 as to whether the desulfation performed at the stoichiometric air-fuel ratio and a high exhaust temperature lasted for an interval of time equivalent to the predetermined time tdesul. The predetermined time tdesul is the processing time for desulfation for each alternating repetition of DPF regeneration and desulfation. If desulfation has been performed for an interval of time equivalent to the predetermined time tdesul, the process moves to step S207, and by setting the reg flag to 1, the next cycle of DPF regeneration (the processing shown in the flowchart in FIG. 7) is carried out.

In step S208, a determination is made as to whether the total time for desulfation has exceeded a predetermined time t desu totall. When the total time for desulfation processing is equal to or less than the predetermined time t desu totall, the main routine is ended without further branching in order to perform desulfation again after the next cycle of DPF regeneration. On the other hand, when the total time for desulfation processing has exceeded the predetermined time t desu totall, it is concluded that desulfation is complete and the process moves to step S209.

In step S209, stoichiometric operation for desulfation is ended, and in step S210, the rec flag is set to 1 in order to carry out the melt prevention mode.

In step S211, the desul flag is reset to 0.

In step S212, the estimated accumulation of NOx in the NOx trapping catalytic converter 13 is reset to 0.

In step S213, the re-sp flag indicating a rich spike request is reset to 0. The reason is that desulfation exposes the NOx trapping catalytic converter 13 to a prolonged stoichiometric air-fuel ratio, so NOx is desorbed/reduced at the same time.

Figure 8:
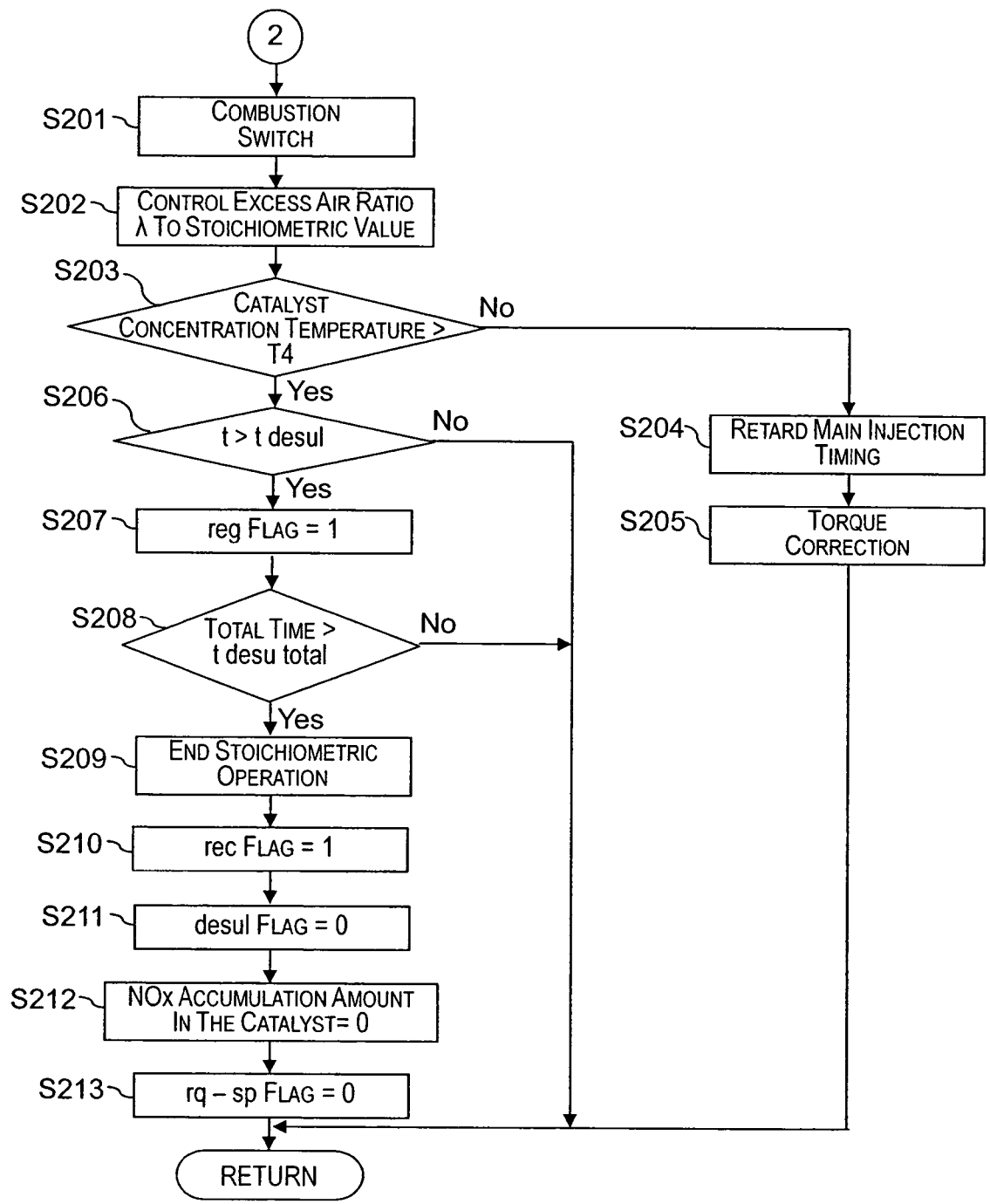
FIG. 8 is a flowchart showing processing for desulfation in accordance with the embodiments of the present invention.

In the DPF regeneration and desulfation processing shown in FIGS. 7 and 8, the DPF regeneration and desulfation are configured to be repeated in a continuous alternating fashion, but also possible is a configuration whereby the DPF regeneration and desulfation are performed separately based on the accumulated amounts of particulate matter and sulfur.

When the DPF is continuously regenerated until completion, DPF regeneration can be performed with adequate efficiency while preventing the diesel particulate filter 14 from melting by varying the target exhaust air-fuel ratio and/or the target filter temperature (target upper limit T21) with the passage of time (decrease in exhaust particulate matter).

In a configuration whereby DPF regeneration and desulfation are repeated in a continuous alternating fashion, it is also possible to vary the target exhaust air-fuel ratio and/or the target filter temperature during a single cycle of DPF regeneration.

Also possible is a configuration whereby one or two parameters selected from among the target filter temperature, target exhaust air-fuel ratio, and target regeneration control time are varied in accordance with the amount of exhaust particulate matter, rather than a configuration whereby all of the target filter temperature, target exhaust air-fuel ratio, and target regeneration control time are varied.

Figure 9:
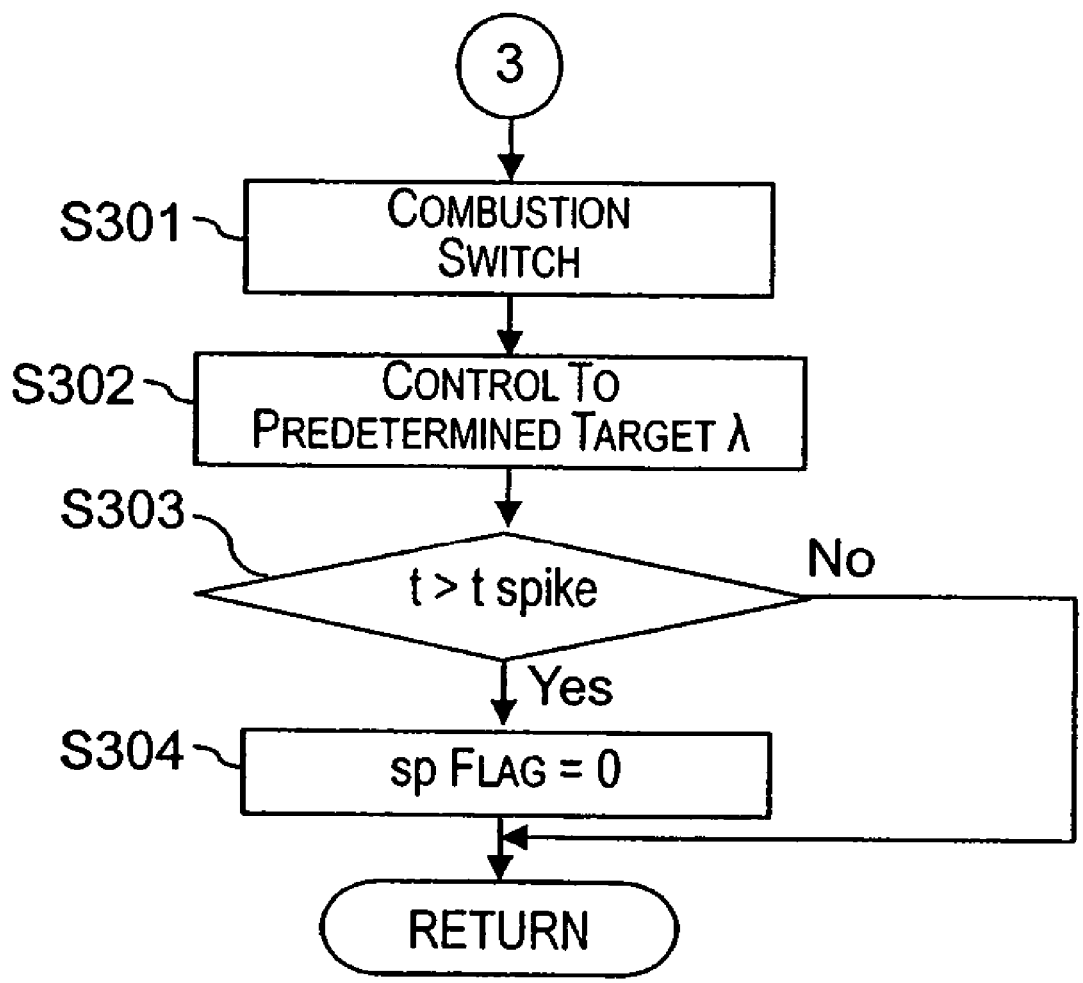
FIG. 9 is a flowchart showing rich spike processing in accordance with the embodiments of the present invention.

Next, the rich spike mode (processing for NOx desorption/reduction) is described based on the flowchart in FIG. 9.

In step S301, a switch is made from regular combustion to staged retarded combustion.

Figure 23:
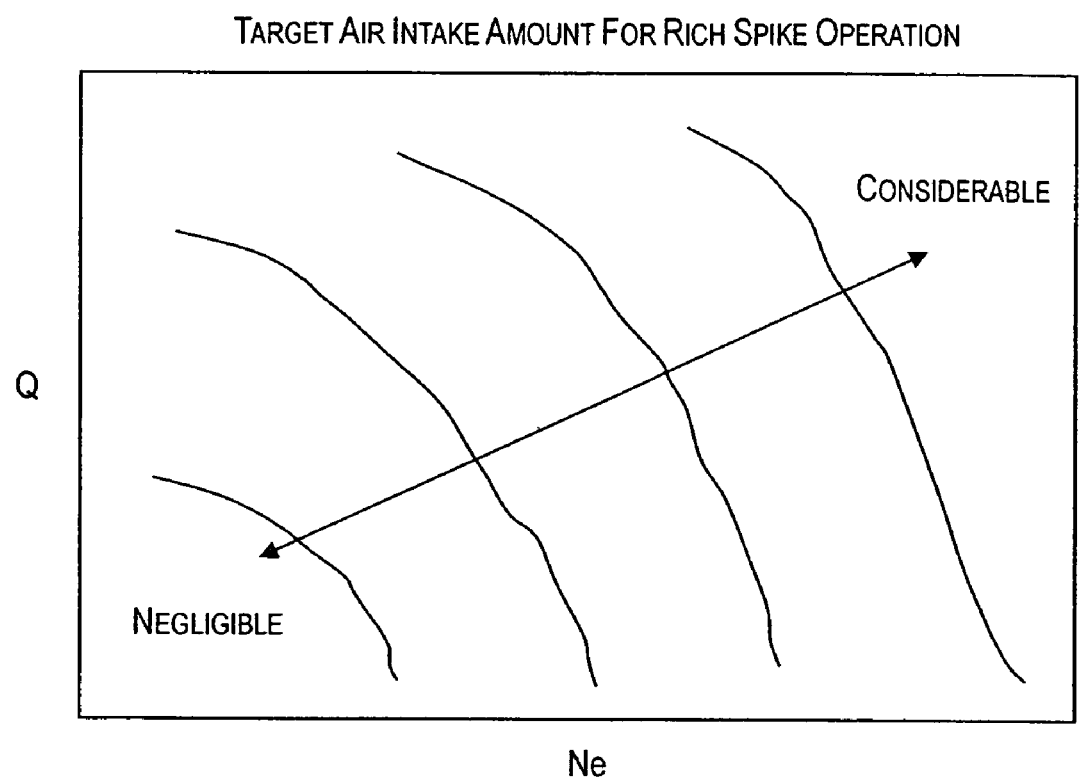
FIG. 23 is a diagram showing the characteristics of the target air intake amount in the rich spike in accordance with the embodiments of the present invention.

In step S302, the air-fuel ratio is controlled to a predetermined target air-fuel ratio (rich air-fuel ratio) for carrying out a rich spike. Here, adjusting the air intake amount to the target level shown in FIG. 23 can bring the air-fuel ratio to the target level.

The atmosphere of the NOx trapping catalytic converter 13 is thereby temporarily made rich (reduced atmosphere), and the NOx trapped in the NOx trapping catalytic converter 13 is desorbed/reduced.

In step S303, a determination is made as to whether the time t during which rich spike control was performed has exceeded a predetermined time tspike. When the rich spike control time t has exceeded the predetermined time tspike, the process moves to step S304.

In step S304, the sp flag indicating the spike flag mode is set to 0. On the other hand, when the rich spike control time t has not exceeded the predetermined time tspike, the process bypasses step S304 and ends the main routine in order to continue rich spike control.

Figure 10:
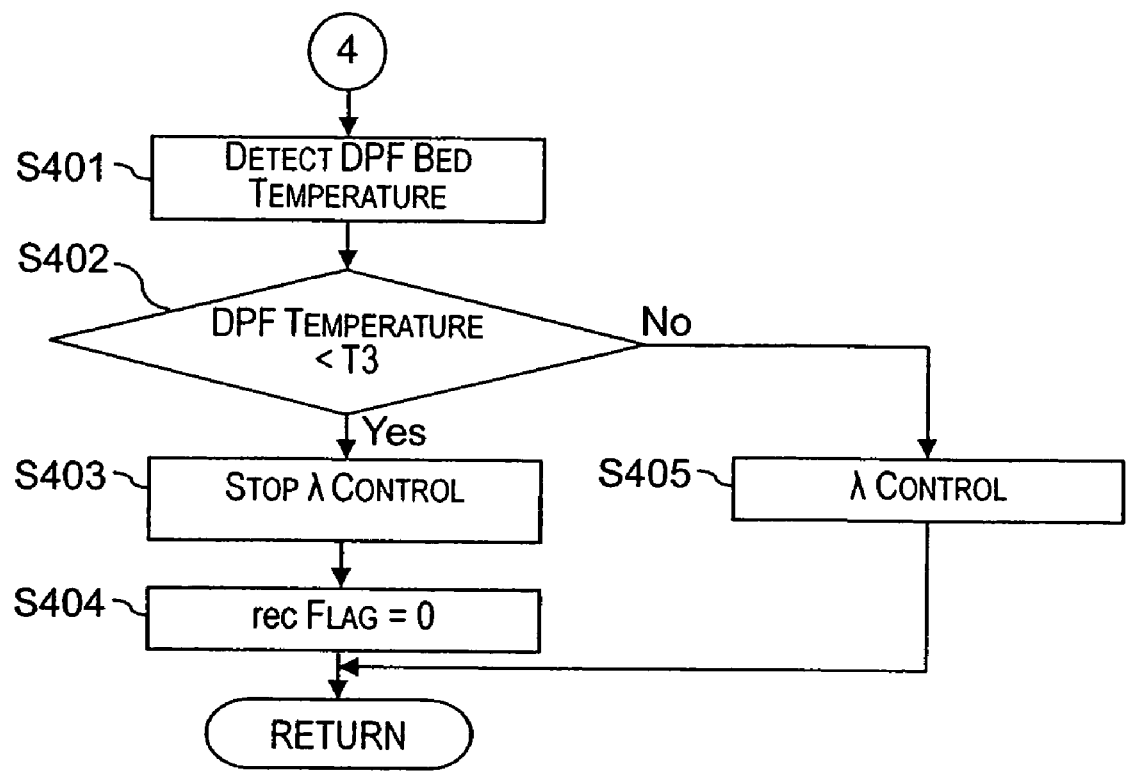
FIG. 10 is a flowchart showing the melt prevention mode in the embodiments.

Next, the melt prevention mode is described based on the flowchart in FIG. 10.

In step S401, the temperature of the diesel particulate filter 14 is detected.

In step S402, by making a determination as to whether the temperature of the diesel particulate filter 14 is less than a predetermined temperature T3, a determination is made as to whether the DPF temperature is in a temperature range in which the rapid oxidation of the particulate matter PM is not initiated.

When the temperature of the diesel particulate filter 14 is equal to or higher than the predetermined temperature T3, the process moves to step S405.

In step S405 the exhaust temperature must be kept low and the temperature of the diesel particulate filter 14 must be reduced to less than the predetermined temperature T3, so the air-fuel ratio is controlled to the predetermined value or less by controlling the air intake throttle valve 6 and/or the EGR control valve 19.

On the other hand, when the temperature of the diesel particulate filter 14 is less than the predetermined temperature T3, it is determined that melt prevention is not required and the process moves to step S403.

In step S403, the air-fuel ratio control in step S405 is stopped, and in the subsequent step S404 the rec flag is set to 0.

Figure 11:
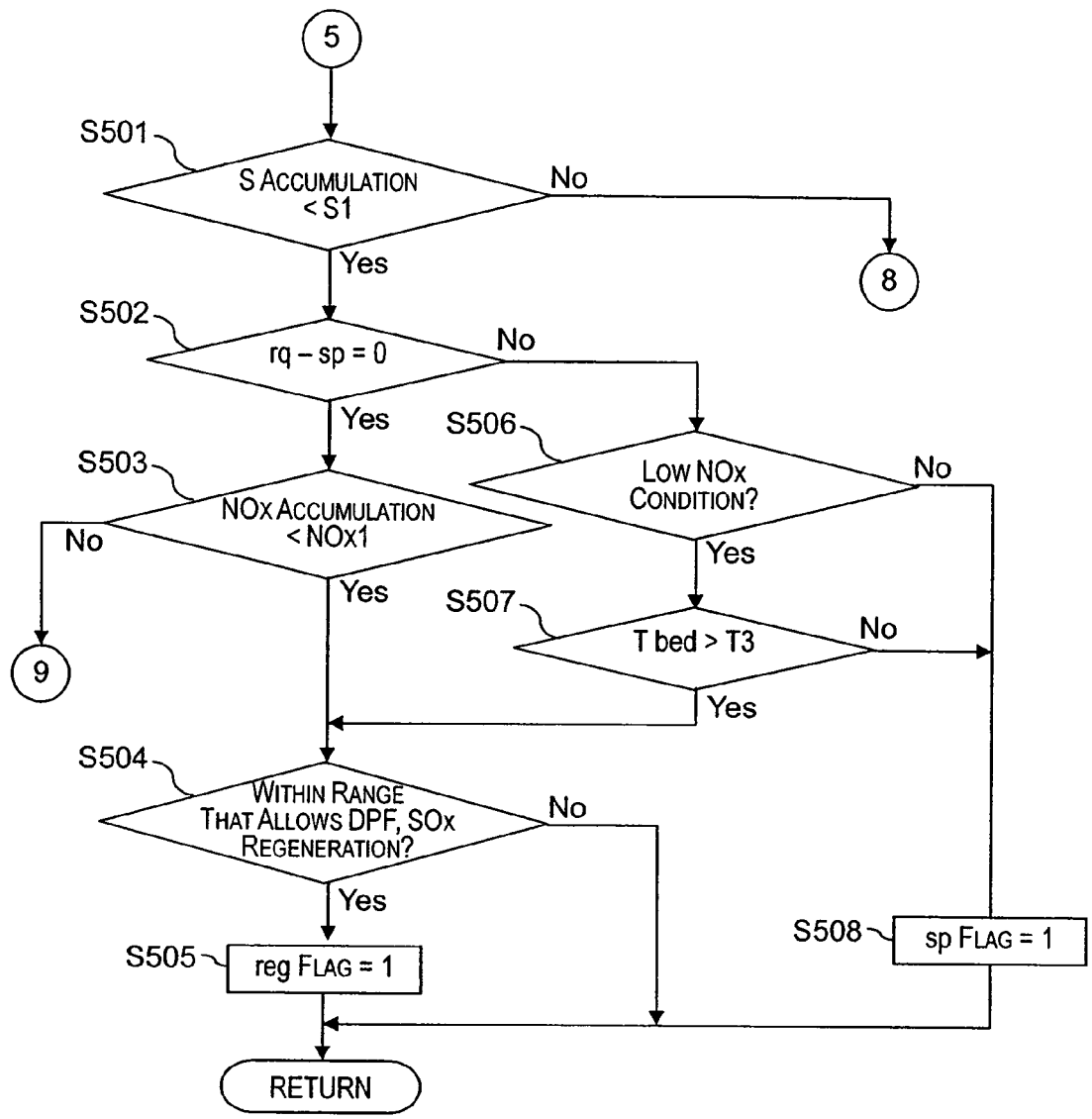
FIG. 11 is a flowchart showing the decision process for regeneration processing during a DPF regeneration request in accordance with the embodiments of the present invention.

Next, the processing during a DPF regeneration request is described based on the flowchart in FIG. 11.

In step S501, a determination is made as to whether the sulfur accumulation amount in the NOx trapping catalytic converter 13 is less than the required predetermined amount S1 for desulfation.

When the sulfur accumulation amount is less than the predetermined amount S1, the process moves to step S502.

Figure 14:
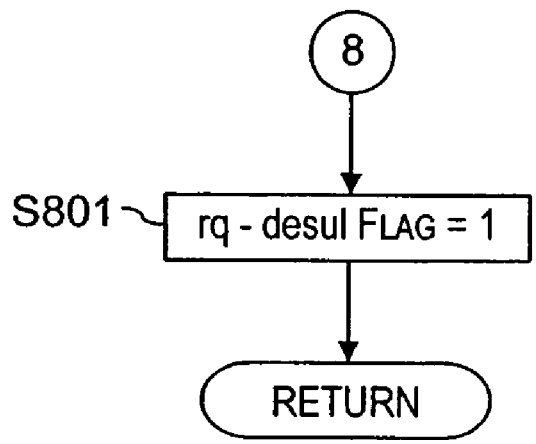
FIG. 14 is a flowchart showing the setting process for a desulfation request in accordance with the embodiments of the present invention.
Figure 15:
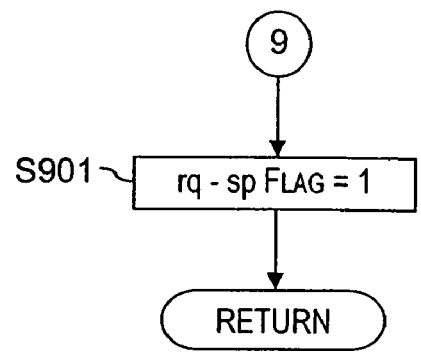
FIG. 15 is a flowchart showing the setting process for a rich spike request in accordance with the embodiments of the present invention.

On the other hand, when the sulfur accumulation amount is equal to or greater than the predetermined amount S1, the process moves to step S801 in FIG. 14, and the rq-desul flag (desulfation request flag) is set to 1.

In step S502, the presence or absence of a rich spike request (request for NOx desorption/reduction) is determined based on the rq-sp flag. When the rq-sp flag is 0 and there is no rich spike request (request for NOx desorption/reduction), the process moves to step S503. On the other hand, when the rq-sp flag is 1 and there is a rich spike request (request for NOx desorption/reduction), the process moves to step S506.

In step S503, a determination is made as to whether the NOx accumulation amount in the NOx trapping catalytic converter 13 is less than the required predetermined amount NOx1 for a rich spike (NOx desorption/reduction). When the NOx accumulation amount is less than the predetermined amount NOx1, the process moves to step S504. On the other hand, when the NOx accumulation amount is equal to or greater than the predetermined amount NOx1, the process moves to step S901 in FIG. 15 and the rq-sp flag is set to 1.

In step S504, a determination is made as to whether the current operating conditions correspond to the range in which DPF regeneration and desulfation by staged retarded combustion is possible. When the current engine speed Ne and load correspond to the range in which the DPF can be regenerated and desulfated, the process moves to step S505.

In step S505, processing in the DPF regeneration mode is performed by setting the reg flag to 1. When the current engine speed Ne and load do not correspond to the range in which DPF regeneration and desulfation is possible, DPF regeneration cannot be performed, so step S505 is bypassed and the main routine is ended.

When the process moves from step S502 to step S506, in other words, when both a request for DPF regeneration and a request for NOx desorption/reduction are generated, a determination is made as to whether the current operating conditions are those (regular operating conditions, for example) in which the amount of NOx exhaust is negligible.

When the operating conditions are such that the NOx exhaust amount is considerable, the process moves to step S508, and NOx desorption/reduction (rich spike processing) is given priority over DPF regeneration by setting the sp flag to 1. On the other hand, when the operation conditions are such that the NOx exhaust amount is negligible, the process moves to step S507.

In step S507, a determination is made at to whether the bed temperature Tbed of the diesel particulate filter 14 is higher than the predetermined temperature T3.

When the bed temperature Tbed of the diesel particulate filter 14 is higher than the predetermined temperature T3, the process moves to step S504, and if the operating conditions correspond to the range in which DPF regeneration is possible, the reg flag is set to 1. On the other hand, when the bed temperature Tbed of the diesel particulate filter 14 is equal to or less than the predetermined temperature T3, the process moves to step S508 and the sp flag is set to 1. This is due to the fact that when the bed temperature Tbed of the diesel particulate filter 14 is equal to or less than the predetermined temperature T3, NOx desorption/reduction is given priority because time is required for the bed temperature Tbed of the diesel particulate filter 14 to reach the temperature at which regeneration is possible, even if a temperature increase is initiated.

Figure 12:
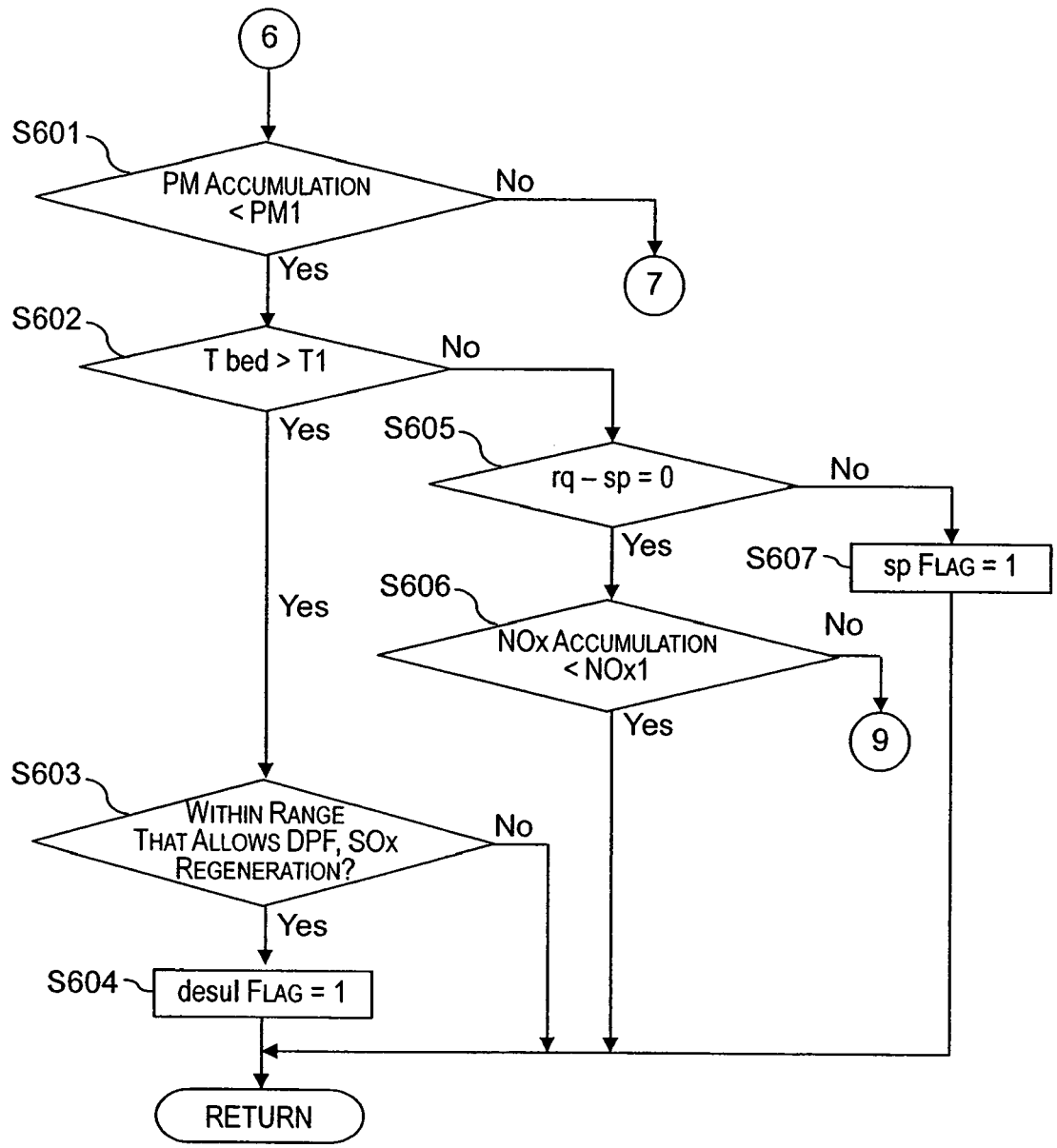
FIG. 12 is a flowchart showing the decision process for regeneration processing during a desulfation request in accordance with the embodiments of the present invention.
Figure 13:
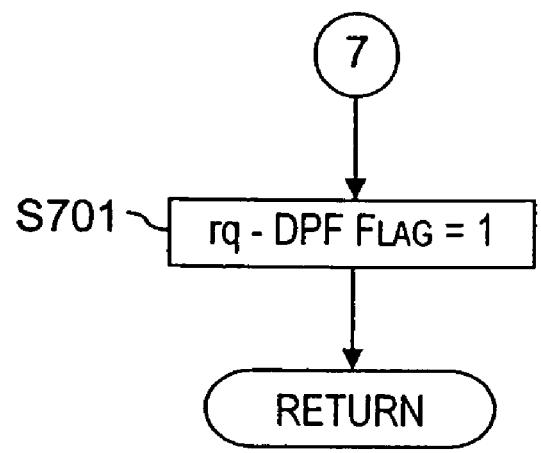
FIG. 13 is a flowchart showing the setting process for a DPF regeneration request in accordance with the embodiments of the present invention.

Next, processing during a desulfation request is described based on the flow chart in FIG. 12.

In step S601, a determination is made as to whether the amount of particulate matter PM collected in the diesel particulate filter 14 is less than the predetermined amount PM1. When the accumulated amount of PM is equal to or greater than the predetermined amount PM1, the process moves to step S602. On the other hand, when the accumulated amount of PM is equal to or greater than the predetermined amount PM1, the process moves to step S701 in FIG. 13 and the rq-DPF flag is set to 1.

In step S602, a determination is made as to whether the bed temperature Tbed of the NOx trapping catalytic converter 13 is higher than a predetermined amount T1. The predetermined temperature T1 is the bed temperature of the NOx trapping catalytic converter 13 that is suitable for desulfation. When the bed temperature Tbed of the NOx trapping catalytic converter 13 is higher than the predetermined amount T1, the process moves to step S603.

In step S603, a determination is made as to whether the current operating conditions correspond to the range in which the DPF can be regenerated and desulfated by staged retarded combustion. When the current operating conditions are within a range in which regeneration is possible, the process moves to step S604, and the desul flag is set to 1 so that desulfation processing is performed. On the other hand, when the current operating conditions do not correspond to the range in which the DPF can be regenerated and desulfated by staged retarded combustion, the process bypasses step S604 and ends the main routine. When the bed temperature Tbed of the NOx trapping catalytic converter 13 is equal to or less than the predetermined amount T1, the process moves to step S605.

In step S605, the presence or absence of a rich spike request (request for NOx desorption/reduction) is determined based on the rq-sp flag. When there is no rich spike request (rq-sp flag is 0), the process moves to step S606.

In step S603, a determination is made as to whether the NOx accumulation amount is less than the predetermined amount NOx1 required for NOx desorption/reduction. When the NOx accumulation amount is less than the predetermined amount NOx1, the main routine is ended without further branching, and when the NOx accumulation amount is equal to or greater than the predetermined amount NOx1, the process sets the rq-sp flag to 1 in step S901 in FIG. 15 and generates a request for NOx desorption/reduction (rich spike request). On the other hand, when it is determined that a rich spike request has been issued (rq-sp=1) in step S605, the process moves to step S607, and the sp flag is set to 1 so that NOx is desorbed/reduced.

Figure 16:
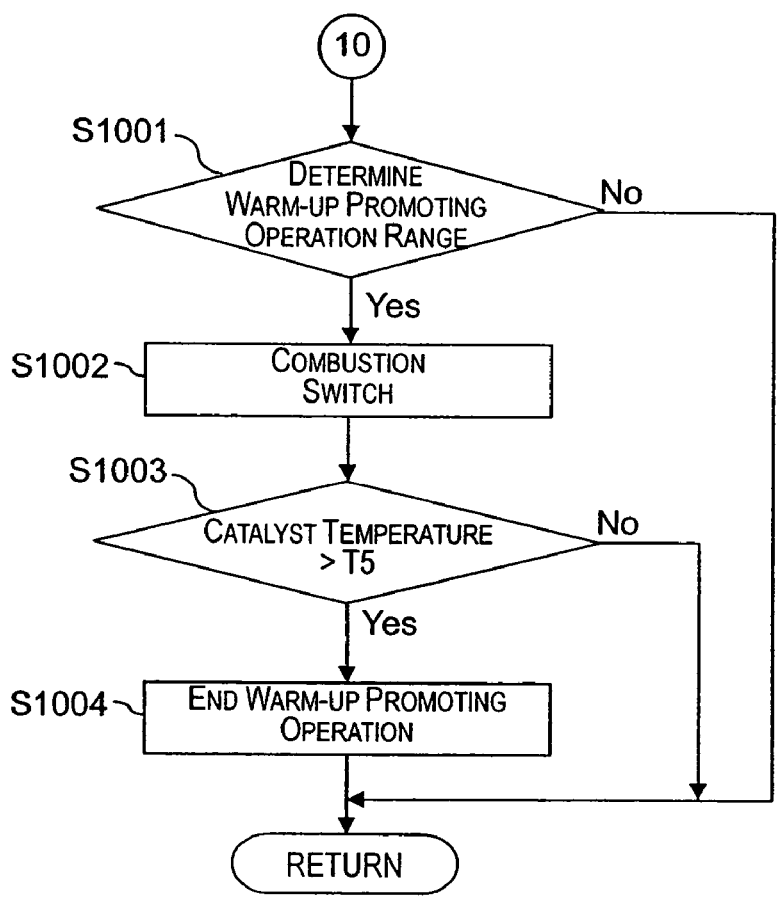
FIG. 16 is a flowchart showing the control process for promoting activation of the NOx trapping catalytic converter in accordance with the embodiments of the present invention.

Next, processing for early activation of the NOx trapping catalytic converter 13 using the staged retarded combustion is described based on the flowchart in FIG. 16.

In step S1001, a determination is made as to whether operation for promoting NOx trapping catalytic converter 13 warm-up is possible. Promoting the warm-up of the NOx trapping catalytic converter 13 is ensured by staged retarded combustion, so in step S1001, a determination is made as to whether operating conditions exist that allow operation by staged retarded combustion. If conditions are such that the warm-up of the NOx trapping catalytic converter 13 can be promoted by an operation based on staged retarded combustion, the process moves to step S1002 and a switch is made from the regular combustion mode to staged retarded combustion.

In the staged retarded combustion, the timing for the main combustion can be considerably retarded, an increase in the exhaust temperature can thereby be ensured, and warm-up of the NOx trapping catalytic converter 13 is promoted.

In step S1003, a determination is made as to whether the temperature of the NOx trapping catalytic converter 13 is higher than an activation temperature T5.

The process moves to step S1004 when the temperature of the NOx trapping catalytic converter 13 is higher that the activation temperature T5, and processing for promoting the warm-up of the NOx trapping catalytic converter 13 is ended by switching back from staged retarded combustion to the regular combustion mode.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

This application claims priority to Japanese Patent Application No. 2003-163578. The entire disclosure of Japanese Patent Application No. 2003-163578 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A regeneration control system for an engine comprising:
   an exhaust particulate collecting section configured to collect particulate matter from exhaust gas from the engine;
   a regeneration control section configured to conduct regeneration control for at least oxidizing the particulate matter collected by the exhaust particulate collecting section; and
   a control unit configured to adjust during the regeneration control at least one of a target filter temperature, a target exhaust air-fuel ratio, and a target regeneration control time in the regeneration control for oxidizing the particulate matter collected by the exhaust particulate collecting section in accordance with a decrease in the particulate matter collected by the exhaust particulate collecting section associated with the regeneration control,
   the control unit being configured to adjust the target exhaust air-fuel ratio to a leaner value during the regeneration control in accordance with the decrease in the particulate matter collected by the exhaust particulate collecting section.

2. The regeneration control system according to claim 1, wherein
   the control unit is configured to increase the target filter temperature during the regeneration control in accordance with the decrease in the particulate matter collected by the exhaust particulate collecting section.

3. The regeneration control system according to claim 1, wherein
   the control unit is configured to lengthen the target regeneration control time during the regeneration control in accordance with the decrease in the particulate matter collected by the exhaust particulate collecting section.

4. The regeneration control system according to claim 1, wherein
   the control unit is configured to adjust during the regeneration control at least one of the target filter temperature to a higher temperature and the target regeneration control time to a longer period of time in accordance with the decrease in the particulate matter collected by the exhaust particulate collecting section.

5. The regeneration control system according to claim 1, wherein
   the control unit is configured to estimate the decrease in the particulate matter collected by the exhaust particulate collecting section based on an elapsed time of the regeneration control.

6. The regeneration control system according to claim 1, wherein
   the exhaust particulate collecting section comprises an exhaust filter configured to collect the particulate matter and a NOx trapping catalytic converter configured to collect NOx in the exhaust gas in a lean atmosphere,
   the control unit is further configured to conduct the regeneration control with an exhaust particulate regeneration control period to oxidize the particulate matter collected by the exhaust filter and a NOx regeneration control period to release sulfur poison from the NOx trapping catalytic converter in alternate succession, and
   the control unit is further configured to adjust at least one of the target filter temperature to a higher value, the target exhaust air-fuel ratio to a leaner value and the target regeneration control time to longer period of time for subsequent ones of the exhaust particulate regeneration control period during one cycle of the regeneration control.

7. A regeneration control system for an engine comprising:
   an exhaust particulate collecting section configured to collect particulate matter from exhaust gas from the engine;
   a regeneration control section configured to conduct regeneration control for at least oxidizing the particulate matter collected by the exhaust particulate collecting section; and
   a control unit configured to adjust during the regeneration control at least one of a target filter temperature, a target exhaust air-fuel ratio, and a target regeneration control time in the regeneration control for oxidizing the particulate matter collected by the exhaust particulate collecting section in accordance with a decrease in the particulate matter collected by the exhaust particulate collecting section associated with the regeneration control,
   the control unit being configured to increase the target filter temperature during the regeneration control, to make the target exhaust air-fuel ratio leaner during the regeneration control, and to lengthen the target regeneration control time during the regeneration control for subsequent increases in the target filter temperature and subsequent adjustments of the target exhaust air-fuel ratio to the leaner value in accordance with the decrease in the particulate matter collected by the exhaust particulate collecting section.

8. The regeneration control system according to claim 7, wherein
the control unit is configured to estimate the decrease in the particulate matter collected by the exhaust particulate collecting section based on an elapsed time of the regeneration control.

9. The regeneration control system according to claim 7, wherein
the exhaust particulate collecting section comprises an exhaust filter configured to collect the particulate matter and a NOx trapping catalytic converter configured to collect NOx in the exhaust gas in a lean atmosphere;
the control unit is further configured to conduct the regeneration control with an exhaust particulate regeneration control period to oxidize the particulate matter collected by the exhaust filter and a NOx regeneration control period to release sulfur poison from the NOx trapping catalytic converter in alternate succession, and
the control unit is further configured to increase the target filter temperature for subsequent ones of the exhaust particulate regeneration control periods during one cycle the regeneration control, to make the target exhaust air-fuel ratio leaner during subsequent ones of the exhaust particulate regeneration control period during one cycle the regeneration control, and to lengthen the target regeneration control time for subsequent ones of the exhaust particulate regeneration control period during one cycle the regeneration control.

10. The regeneration control system according to claim 7, wherein
the control unit is further configured to perform the regeneration control via a combustion mode composed of a preliminary combustion that is performed at least once in a vicinity of the top dead center, and a main combustion that is initiated after the preliminary combustion has been entirely completed to generate a main torque.

11. The regeneration control system according to claim 10, wherein
the control unit is further configured to control a fuel injection amount for the preliminary combustion so that a cylinder temperature during fuel injection for the main combustion exceeds a temperature at which self-ignition is possible.

12. The regeneration control system according to claim 10, wherein
the control unit is further configured to control an interval of time between a preliminary combustion start time for the preliminary combustion and a main combustion start time for the main combustion to a crank angle of 20° or greater.

13. The regeneration control system according to claim 10, wherein
the control unit is further configured to control a main completion time for the main combustion to a crank angle of 50° or greater from a compression top dead center.

14. The regeneration control system according to claim 10, wherein
the control unit is further configured to control a temperature of the exhaust filter by varying a fuel injection time for the main combustion.

15. A regeneration control system for an engine comprising:
an exhaust particulate collecting section configured to collect particulate matter from exhaust gas from the engine;
a regeneration control section configured to conduct regeneration control for at least oxidizing the particulate matter collected by the exhaust particulate collecting section; and
a control unit configured to adjust during the regeneration control at least one of a target filter temperature, a target exhaust air-fuel ratio, and a target regeneration control time in the regeneration control for oxidizing the particulate matter collected by the exhaust particulate collecting section in accordance with a decrease in the particulate matter collected by the exhaust particulate collecting section associated with the regeneration control,
the control unit being further configured to perform the regeneration control via a combustion mode composed of a preliminary combustion that is performed at least once in a vicinity of the top dead center, and a main combustion that is initiated after the preliminary combustion has been entirely completed to generate a main torque.

16. The regeneration control system according to claim 15, wherein
the control unit is further configured to control a fuel injection amount for the preliminary combustion so that a cylinder temperature during fuel injection for the main combustion exceeds a temperature at which self-ignition is possible.

17. The regeneration control system according to claim 15, wherein
the control unit is further configured to control an interval of time between a preliminary combustion start time for the preliminary combustion and a main combustion start time for the main combustion to a crank angle of 20° or greater.

18. The regeneration control system according to claim 15, wherein
the control unit is further configured to control a main completion time for the main combustion to a crank angle of 50° or greater from a compression top dead center.

19. The regeneration control system according to claim 15, wherein
the control unit is further configured to control a temperature of the exhaust filter by varying a fuel injection time for the main combustion.

20. A regeneration control system for an engine comprising:
an exhaust particulate collecting section configured to collect particulate matter from exhaust gas from the engine;
a regeneration control section configured to conduct regeneration control for at least oxidizing the particulate matter collected by the exhaust particulate collecting section; and
a control unit configured to adjust during the regeneration control at least a target exhaust air-fuel ratio for oxidizing the particulate matter collected by the exhaust particulate collecting section in accordance with a decrease in the particulate matter collected by the exhaust particulate collecting section associated with the regeneration control, the control unit being further configured to perform the regeneration control via a combustion mode composed of at least two preliminary combustions with one of the preliminary combustions being performed in a vicinity of the top dead center, and a main combustion that is initiated after the preliminary combustions have been entirely completed to generate a main torque.

21. A regeneration control system for an engine comprising:
an exhaust particulate collecting section configured to collect particulate matter from exhaust gas from the engine;
a regeneration control section configured to conduct regeneration control for at least oxidizing the particulate matter collected by the exhaust particulate collecting section; and
a control unit configured to adjust during the regeneration control at least one of a target filter temperature, a target exhaust air-fuel ratio, and a target regeneration control time in the regeneration control for oxidizing the particulate matter collected by the exhaust particulate collecting section in accordance with a decrease in the particulate matter collected by the exhaust particulate collecting section associated with the regeneration control,
the control unit being further configured to perform the regeneration control via a combustion mode composed of at least two preliminary combustions with one of the preliminary combustions being performed in a vicinity of the top dead center, and a main combustion that is initiated after the preliminary combustions have been entirely completed to generate a main torque.

22. The regeneration control system according to claim 21, wherein
the control unit is further configured to control an interval of time between a preliminary combustion start time for the preliminary combustions and a main combustion start time for the main combustion to a crank angle of 20° or greater.

23. The regeneration control system according to claim 21, wherein
the control unit is further configured to control a main completion time for the main combustion to a crank angle of 50° or greater from a compression top dead center.

24. A regeneration control system for an engine comprising:
exhaust particulate collecting means for collecting particulate matter from exhaust gas from the engine;
regeneration control means for conducting regeneration control for oxidizing the particulate matter collected by the exhaust particulate collecting means; and
control means for adjusting at least a target exhaust air-fuel ratio for oxidizing the particulate matter collected by the exhaust particulate collecting means in accordance with a decrease in the exhaust particles collected by the exhaust particulate collecting means associated with the regeneration control, the control means further including a function for adjusting the target exhaust air-fuel ratio to a leaner value during the regeneration control in accordance with the decrease in the particulate matter collected by the exhaust particulate collecting means.

25. A method of regenerating an exhaust particulate collecting section of an engine comprising:
collecting particulate matter from exhaust gas from the engine;
conducting regeneration control for oxidizing the particulate matter collected by the exhaust particulate collecting section; and
adjusting at least a target exhaust air-fuel ratio for oxidizing the particulate matter collected by the exhaust particulate collecting section in accordance with a decrease in the exhaust particles collected by the exhaust particulate collecting section associated with the regeneration control by adjusting the target exhaust air-fuel ratio to a leaner value during the regeneration control in accordance with the decrease in the collected particulate matter.

* * * * *